United States Patent
Burton

(10) Patent No.: US 8,496,421 B1
(45) Date of Patent: Jul. 30, 2013

(54) FERRULE LOCK NUTS

(76) Inventor: Christopher C. Burton, Chesterland, OH (US)

( * ) Notice: Subject to any disclaimer, the term of this patent is extended or adjusted under 35 U.S.C. 154(b) by 192 days.

(21) Appl. No.: 13/032,627

(22) Filed: Feb. 22, 2011

Related U.S. Application Data

(60) Provisional application No. 61/411,476, filed on Nov. 9, 2010, provisional application No. 61/419,798, filed on Dec. 3, 2010, provisional application No. 61/434,326, filed on Jan. 19, 2011, provisional application No. 61/439,175, filed on Feb. 3, 2011.

(51) Int. Cl.
*F16B 39/36* (2006.01)

(52) U.S. Cl.
USPC ............................ 411/226; 411/257; 411/265

(58) Field of Classification Search
USPC .................. 411/222, 223, 225, 226, 242, 265, 411/277, 257
See application file for complete search history.

(56) References Cited

U.S. PATENT DOCUMENTS

| | | | | |
|---|---|---|---|---|
| 909,033 A * | 1/1909 | Smith | ............................ | 411/222 |
| 1,005,227 A * | 10/1911 | Jones | ............................ | 411/265 |
| 1,128,186 A * | 2/1915 | Raeburn | ........................ | 411/223 |
| 1,134,393 A * | 4/1915 | Lindsay | .......................... | 411/265 |
| 1,144,645 A * | 6/1915 | Fehrenz | .......................... | 411/265 |
| 1,166,538 A * | 1/1916 | Nesbit | ............................ | 411/265 |
| 1,443,751 A * | 1/1923 | Lafever et al. | ................. | 411/223 |
| 1,561,880 A * | 11/1925 | Morrison et al. | ............. | 411/265 |
| 1,677,266 A * | 7/1928 | Brenneman | .................... | 411/226 |
| 1,742,722 A * | 1/1930 | Olsson et al. | .................. | 411/222 |
| 1,959,620 A * | 5/1934 | Eveno | ............................ | 411/277 |
| 2,839,115 A * | 6/1958 | Forgaard | ........................ | 411/265 |
| 3,072,421 A | 1/1963 | Lloyd et al. | | |
| 3,215,457 A | 11/1965 | Teeters | | |
| 4,004,626 A * | 1/1977 | Biblin et al. | .................... | 411/277 |
| 4,134,438 A | 1/1979 | Freiberg et al. | | |
| 5,154,560 A | 10/1992 | Copito | | |
| 5,533,849 A | 7/1996 | Burdick | | |
| 5,908,276 A | 6/1999 | Kerr | | |
| 6,010,290 A | 1/2000 | Slesinski et al. | | |
| 6,071,052 A | 6/2000 | Kerr | | |
| 6,623,047 B2 | 9/2003 | Olechnowicz et al. | | |
| 6,629,708 B2 | 10/2003 | Williams et al. | | |

OTHER PUBLICATIONS

Nord-Lock Home page 2-11-11.pdf NORD-LOCK, "Nord-Lock—Maximum security for bolted joint . . . ", Feb. 11, 2011, p. 1 of 1, © NORD-LOCK International, Sweden, From URL http://www.nord-lock.com/default.asp?url=1.16.37.

(Continued)

*Primary Examiner* — Flemming Saether
(74) *Attorney, Agent, or Firm* — D.A. Stauffer Patent Services LLC

(57) ABSTRACT

Apparatus and Method of use for an improved lock nut type of fastener. On a threaded rod, a set of one or two cavity locknuts are used with a sleeve like ferrule to lock a nut in a set position on the rod. For example a nut that is clamping a workpiece can be held in place (resisting if not preventing loosening) by suitable application of the ferrule and cavity locknut. The cavity locknut has a tapered funnel-like cavity in a nut face around the nut's threaded hole. Locking is accomplished by immobilizing the ferrule on the rod and against the nut to be held, orienting the cavity side of the cavity locknut toward the ferrule, and forcefully torquing the cavity nut against and around the ferrule so that it is crimped against the threaded rod by the tapered cavity in the nut.

18 Claims, 12 Drawing Sheets

OTHER PUBLICATIONS

Nord-Lock junker test explained.pdf NORD-LOCK, "Nord-Lock—Junker test principle", Feb. 11, 2011, p. 1 of 1, © Nord-Lock International, Sweden, From URL http://www.nord-lock.com/default.asp?url=6.16.37.

NORD-LOCK function.pdf Nord-Lock, "Nord-Lock—Locking function", Feb. 11, 2011, p. 1 of 1, © NORD-LOCK International, Sweden, From URL http://www.nord-lock.com/default.asp?url=3.16.37.

Nord-Lock Products.pdf NORD-LOCK, "Nord-Lock—Products", , Feb. 11, 2011, p. 1 of 1, © NORD-LOCK International, Sweden. From URL http://www.nord-lock.com/default.asp?url=2.16.37.

Nord-Lock clamp load vs torque load.pdf NORD-LOCK, "Nord-Lock—Minimize torsion" from Nord-Lock Technical Support page, Feb. 11, 2011, p. 1 of 1, © NORD-LOCK International, Sweden. From URL http://www.nord-lock.com/default.asp?url=386.16.37.

WN_ANCO Nut Lok-Mor.pdf LOC-MOR, Inc, "ANCO Pn-Loc Locknut", product description sheet, p. 1of 1, Nov. 17, 2010, Mansfield, Texas.

Lok-Mor products.pdf LOC-MOR, Inc, "Locknut products, Standard and Metric", p. 1of 1, Nov. 17, 2010, Mansfield, Texas.

* cited by examiner

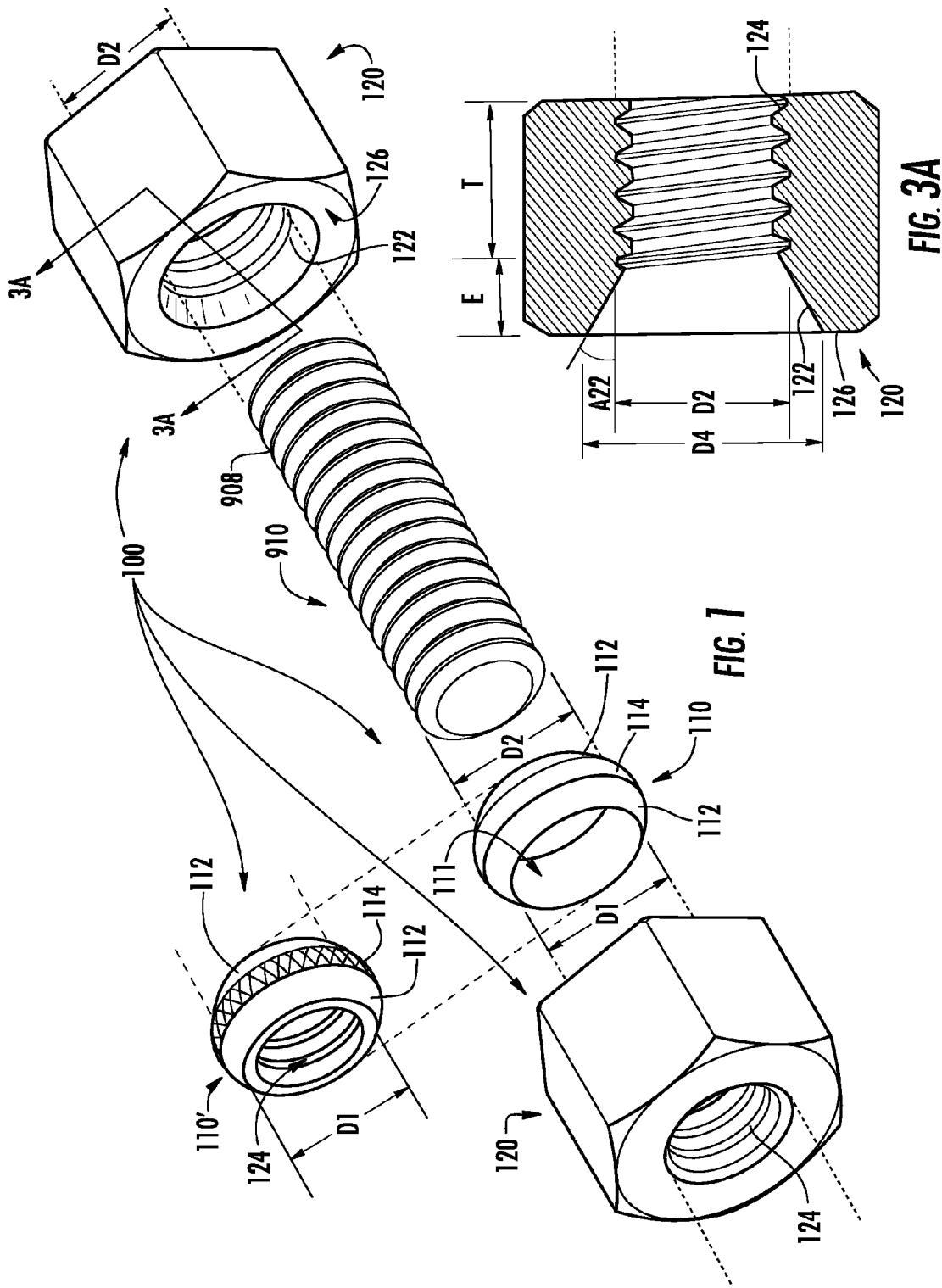

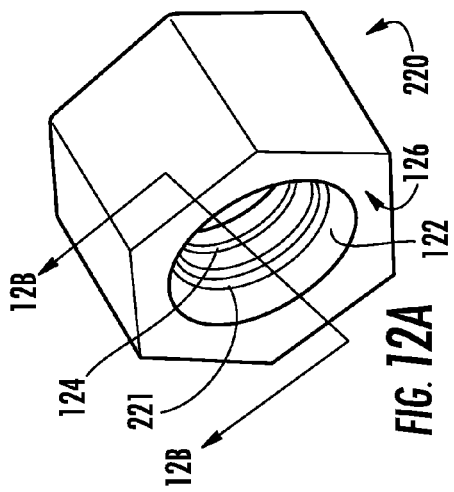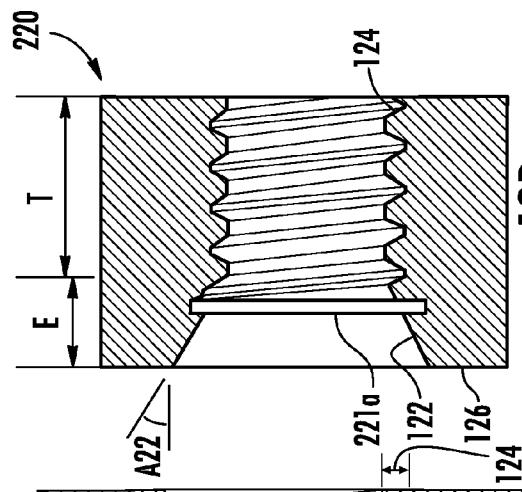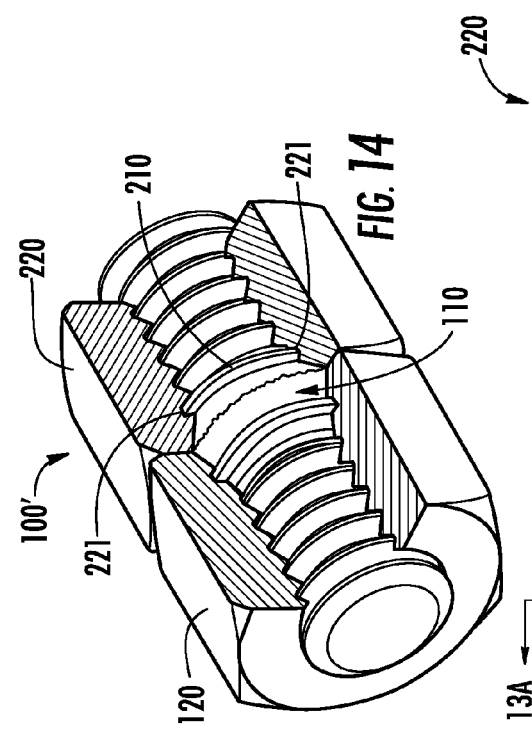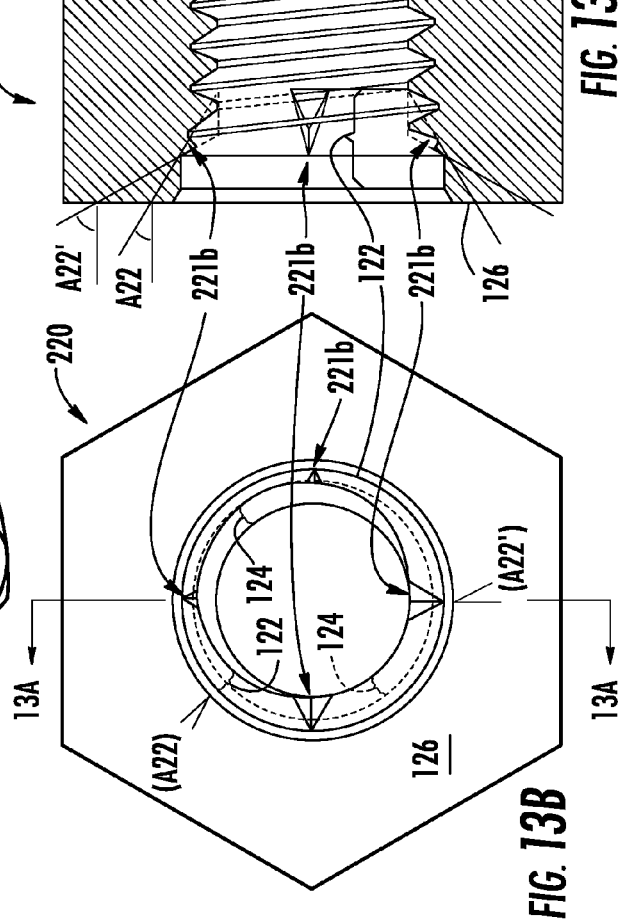

FERRULE LOCK NUTS

CROSS-REFERENCE TO RELATED APPLICATIONS

This application claims the benefit of U.S. Provisional Patent Application Ser. Nos. 61/411,476 filed on Nov. 9, 2010; Ser. No. 61/419,798 filed on Dec. 3, 2010; Ser. No. 61/434,326 filed on Jan. 19, 2011; and Ser. No. 61/439,175 filed on Feb. 3, 2011, all by Applicant Christopher C. Burton; and all of which are incorporated in their entirety by reference herein.

This application is related to another application, designated as Ser. No. 13/032,630 and having a different set of claims with a corresponding summary, but otherwise shares the same specification material and drawings; and is filed by the same applicant, Christopher C. Burton, on a filing date concurrent with that of the present application.

TECHNICAL FIELD OF THE INVENTION

The present invention relates to mechanical fasteners and, more particularly to vibration resistant fasteners.

BACKGROUND OF THE INVENTION

A machine screw-threaded rod (straight, constant diameter, not tapered like a wood screw) and mating threaded nuts are widely used to fasten together or hold one or more objects (workpieces) to form a joint. At least one of the objects has a hole, a loop, a hook, or other means for positioning a sufficient portion of it around the rod and under an inside face of a nut, thereby clamping the object(s) when the nut is tightened. On the other side of the workpiece joint from the nut, the threaded rod has a radially extending portion that is fixed relative to the threaded rod. Typically this portion is either a bolt head or an object (e.g., a second object in the joint) to which the threaded rod is fixed to make a threaded stud extending outward from the object, preferably normal to a locally planar surface. The fixed element (head) serves the purpose of immobilizing any object that is advanced on the rod until it is stopped against the head and other intermediate objects, if any.

For the sake of convenience, the present disclosure may use terms interchangeably when referring to elements that are substantially functionally equivalent in the context being described. Such interchangeable equivalence should be readily apparent from the context of use, and furthermore is usually specifically stated herein. Therefore the use of one equivalent term should be considered as representing the same use of the other equivalent terms. For example, a threaded rod, rod (with threads), stud, bolt or bolt threads are used interchangeably. For example, a bolt head is considered equivalent to a radially extending portion of anything that is fixed relative to the threaded rod (e.g., an object's surface away from which an un-rotatable threaded stud extends).

Because there are so many uses for a simple removable fastener, it is often required to hold under various degrees of vibration and shock. Thus there is a great need for a threaded rod and nut type of fastener that will hold (lock) a joint together at a desired joint pressure (holding force, clamping force) even when subjected to vibration and/or shock loads. Vibration acts like a series of small shocks that, over time, can gradually "ratchet" the nut in an unscrewing direction to make the joint loosen (less joint pressure). Joint pressure is typically indirectly determined and specified in terms of an amount of torque that is required to tighten the nut enough to achieve the desired joint pressure.

For use with a single nut on a bolt or rod, there are a variety of well known "lock washers" in the prior art. One of the more effective versions is a Nord-Lock® Bolt Securing System washer set (NORD-LOCK Inc., 1051 Cambridge Drive, Elk Grove Village, Ill. 60007; www.nord-lock.com). In a typical example, this comprises two washers with interlocking ramps on one face of each, and a non-directional type of radial serrations on the other face of each. The two washers are placed between the nut and a work surface of the outermost object, with the ramped faces against each other. Then the nut is tightened enough to both achieve the desired clamping/joint force and to at least partially embed the serrations in both the working surface and the inside face of the nut. Given this, the interlocking ramps prevent relative rotation between the washers, and therefor between the work surface and the nut (because the serrations are frictionally binding adjacent surfaces to the respective washer). Thus torsional friction holds the nut in place on the threaded rod, and such friction is proportional to the axial load, i.e., the joint pressure.

Unfortunately the Nord-Lock type of lock washer is relatively expensive, as well as adding extra parts to a joint. Furthermore, they lose effectiveness when either the nut face or the working surface is too slippery due to, for example, a hardened surface that doesn't allow sufficient embedding of the serrations.

As is well known, there are many other designs for lock washers, none of which are very effective in holding a joint under vibration or shock.

A different approach to maintaining the joint pressure of nut on a threaded rod/bolt is to use "locknuts." In its simplest form, a first (inner) nut is tightened on the bolt against the fastened work surfaces to a desired torque, which is indicative of an axial force (joint pressure, clamping force) that is desired for holding the fastened joint together. Then a second (outer) nut, designated as s "locknut" or "locking nut", is tightened down against the first nut until a lock nut torsion spec is met, thereby increasing the friction (due to joint pressure) between the two adjacent nut faces to a level considered sufficient to keep the second nut from unscrewing relative to the first. Obviously the nut-nut joint pressure is accompanied by an equivalent axial reaction force that acts on the nut threads against the mating rod threads—in effect slightly stretching the threaded rod and/or distorting the mated threads within the first nut away from the same rod's threads that are mated with the threads inside the second nut.

There are now two effects acting to lock the nut(s) in place on the bolt, thereby maintaining a constant nut-to-work-surface joint pressure. Firstly, since vibration will generally be applied to the work pieces being held together by the nut and bolt, therefore the primary ratcheting effect will occur at the work surface-to-first nut interface, thereby attempting to unscrew the first nut. However, unscrewing the first nut acts in the direction of increasing the joint pressure between the two nuts, and increasing that pressure increases the friction between the nuts while also further distorting the bolt and nut threads. Secondly, although increased friction between nuts can make them act like a single nut effectively glued together, any unscrewing action must overcome resistance due to the thread distortions that reverse direction at the nut-nut interface. The result is that attempting to torque the two nuts as one is like trying to unscrew a nut over mashed or otherwise damaged threads.

Regardless of the theory, neither lock washers nor lock nuts are universally effective, particularly when vibration is a factor. For example, the vibration can cause the locked-together nuts to unscrew together for a small distance before returning to the screwed-on position; however, since the screwing/unscrewing actions are driven by the first nut which is against the work pieces, the nuts may slip against each other on the return, with the first nut being pulled away from the second nut. Even though this is a miniscule effect at first, long term vibration can repeat this step enough times to ratchet the nuts apart sufficient to reduce the nut-to-nut pressure to the point that the countervailing axial forces between nuts and thus the thread distortions are effectively eliminated. At that point the two nuts are no longer locked and can be rather easily unscrewed together, to unfasten the joint.

Another problem is that, to date, the more effective locking devices for fasteners tend to be more expensive and/or more difficult to use properly, often requiring special tools and time consuming extra work. Thus there is still an unmet, long-felt need for a more vibration resistant locking device for nut and bolt fasteners, preferably less expensive and simpler to use in a consistent and reliable way.

Additionally, there is a desire to have such a bolt locking device that can be removed at will, without having to destroy the fastener (e.g., cutting or breaking the bolt, e.g., stripping the threads of the nut(s) and/or bolt). After all, a nut and bolt fastener is often used instead of a rivet when the joint is intended to be un-fastenable at a later time, i.e., the fastener should be removable.

It is an object of the present work to provide a fastening method and device that satisfies the long-felt needs for a more vibration resistant, removable fastener.

BRIEF SUMMARY OF THE INVENTION

According to the invention, a fastener kit for use with a specified threaded rod comprises: a nut having a tapered cavity extending axially inward from a face of the nut and tapering from a larger opening down to the diameter of a threaded portion of the nut; which portion has threads that mate with threads of the specified threaded rod; and a ferrule having an inside diameter defined by a lengthwise bore that permits the ferrule to be positioned on a threaded lengthwise portion of the specified threaded rod.

Further according to the invention, the larger opening of the tapered cavity of the nut has an inside diameter that is greater than or equal to an outside diameter of a lengthwise end of the ferrule.

Further according to the invention, the ferrule bore has threads mated to the threads of the rod.

According to the invention, the fastener kit further comprises the specified threaded rod.

Further according to the invention, the specified threaded rod is a bolt.

According to the invention, the fastener kit further comprises a second nut having a threaded portion with threads that mate with threads of the specified threaded rod. Furthermore, the second nut may have a tapered cavity extending axially inward from a face of the nut, and tapering from a larger opening down to the diameter of the threaded portion of the nut.

Further according to the invention, the nut and the ferrule are designed so that the ferrule will be crimped within the nut cavity against the threads of the specified threaded rod, thereby establishing resistance against movement of the nut; providing that: the ferrule is positioned on a portion of the specified threaded rod where the ferrule is immobilized with respect to lengthwise movement; the nut is threaded onto the rod so that the tapered cavity of the nut is facing a first end of distal first and second lengthwise ends of the ferrule; the nut is positioned so that the tapered cavity of the nut contacts the first end of the ferrule; and the nut is torqued with at least an amount of force that, according to the design, is sufficient to crimp the ferrule against the threads of the specified threaded rod. Furthermore, the ferrule may be immobilized by a second nut positioned on the threaded rod such that an inside face of the nut faces the distal second end of the ferrule. In another provision, the second nut has a tapered cavity extending axially inward from the inside face of the nut, and tapering from a larger opening down to the diameter of the threaded portion of the nut.

Further in accord with the invention, according to the design, the amount of force that is sufficient to crimp the ferrule against the threads of the specified threaded rod is an amount that closes a separation distance between the inside faces of the first and second nuts to essentially zero. Alternatively, according to the design, the amount of force that is sufficient to crimp the ferrule against the threads of the specified threaded rod is an amount that achieves a stated fraction of a turn after the first and second nuts contact the first and second ferrule ends, respectively.

According to the invention, a Fastener Standard strength specification for a nut is achieved by the nut with the tapered cavity by having an extended axial thickness sufficient to maintain a threaded portion of the nut that is in accord with requirements of the Fastener Standard strength specification.

In an embodiment of the fastener kit invention, the nut has a tapered cavity on both axial faces of the nut.

In an embodiment of the fastener kit invention, the ferrule has a lesser outside diameter at either or both of the ends than it does between the ends.

In an embodiment of the fastener kit invention, the ferrule has one or more weakened portions for reducing the amount of force that is sufficient to crimp the ferrule against the threads of the specified threaded rod. Furthermore, the ferrule may be weakened by one or more radially open slots. Even further, one slot may extend the entire length of the ferrule.

In an embodiment of the fastener kit invention, a portion of the ferrule is weakened by reduced thickness.

In an embodiment of the fastener kit invention, a wall of the cavity in the nut has a radially extending groove or ridge feature.

In an embodiment of the fastener kit invention, the nut face with the tapered cavity has a high friction surface feature. Furthermore, the high friction surface feature may comprise radial serrations. Even further, the radial serrations may have a ramped sawtooth shape for interlocking with complementary mating ramps on an adjacent surface.

In an embodiment of the fastener kit invention, the ferrule has a flange that extends radially outward. Furthermore, the flange may have a high friction surface on at least one of an axially front face and an axially back face.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different versions of an element 109 which are similar or related in some way but are separately referenced for the purpose of describing modifications to the parent element (109). Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein:

FIG. 1 is a perspective exploded view of components in a first and second embodiment of a ferrule locknut set, according to the invention.

Figure 2A:
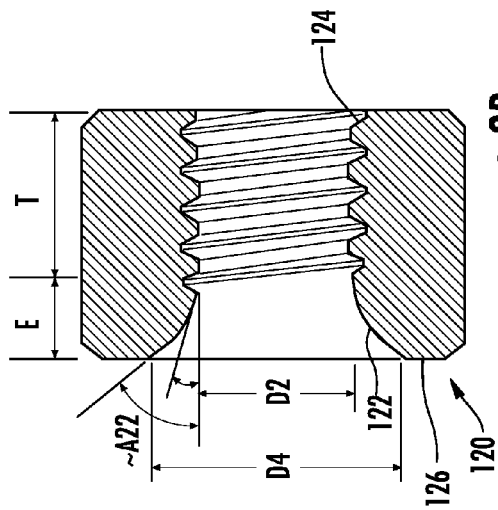
Figure 2B:
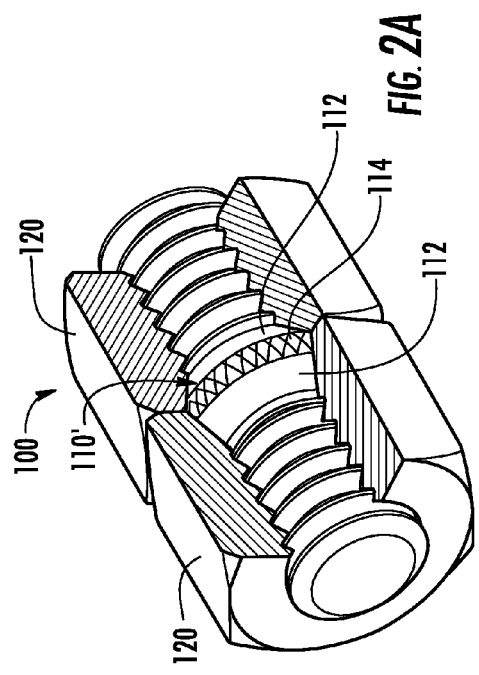

FIGS. 2A-2B are perspective views, partly cut away to show examples of a ferrule locknut set assembled on a threaded rod, according to a method of the invention.

Figure 3B:
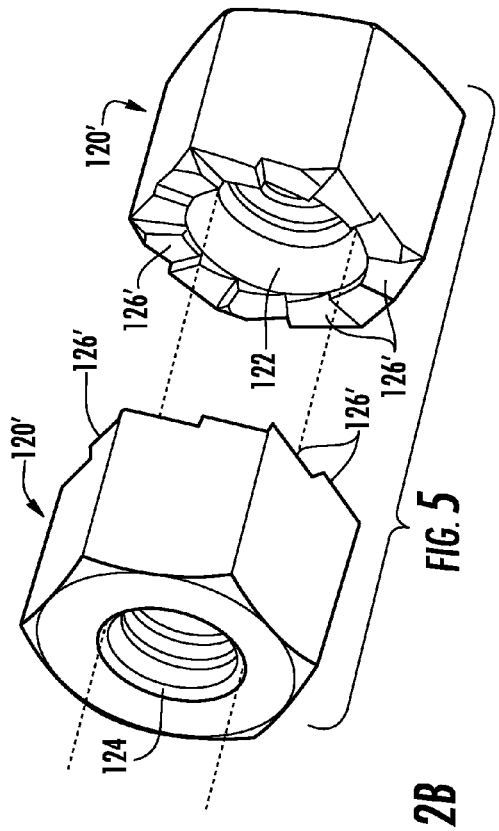

FIGS. 3A-3B are cross-sectional side elevation views taken along the line 3A-3A in FIG. 1, showing examples of tapered cavities in locknuts, according to the invention.

FIGS. 4A-4D are cross-sectional side elevation views of a method of use of a ferruled locknut set, all according to the invention.

Figure 5:
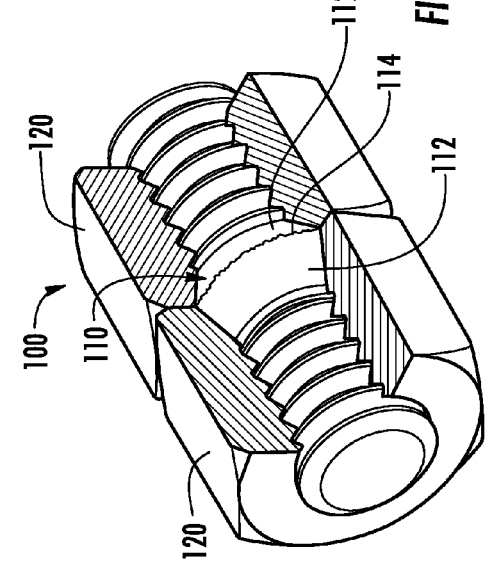

FIG. 5 is a perspective view of locknuts having a high friction surface on inside faces, according to the invention.

FIGS. 6A-6D are cross-sectional side elevation views of a method of use of a ferruled locknut set embodiment that uses a threaded ferrule, all according to the invention.

Figure 7A:
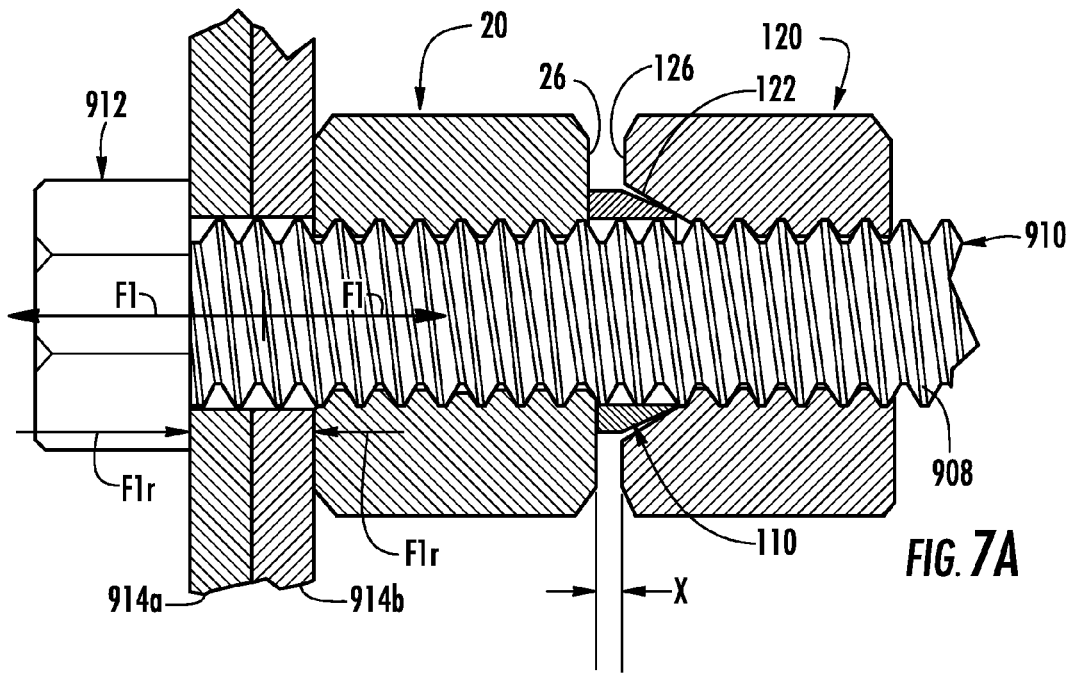
Figure 7B:
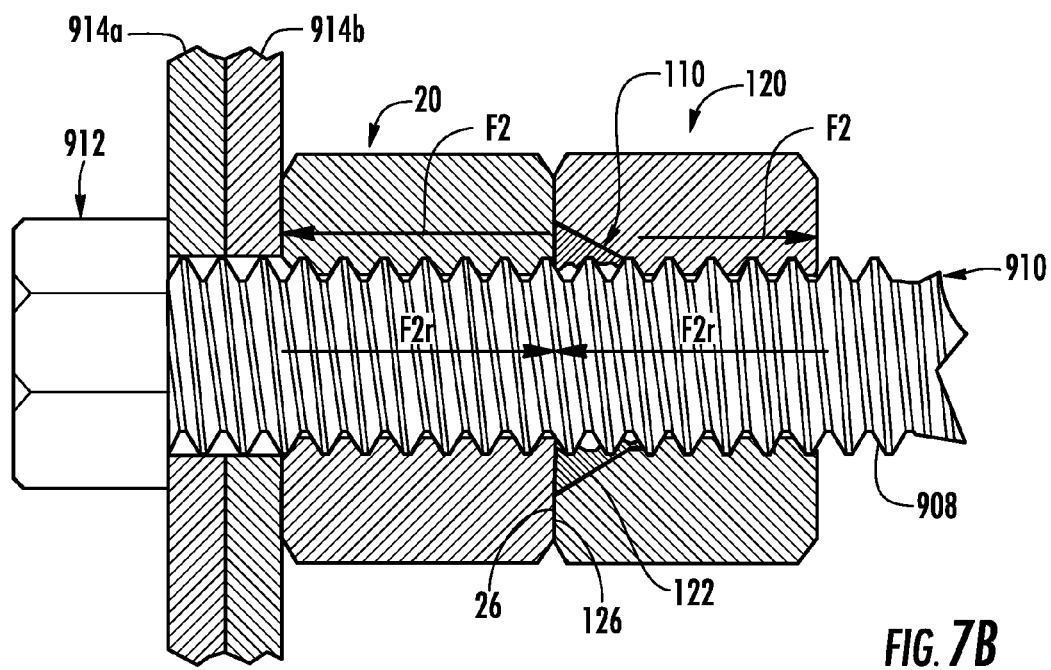

FIGS. 7A-7B are cross-sectional side elevation views of a method of use of a ferruled locknut set embodiment that uses another embodiment of the ferrule, all according to the invention.

Figure 8:
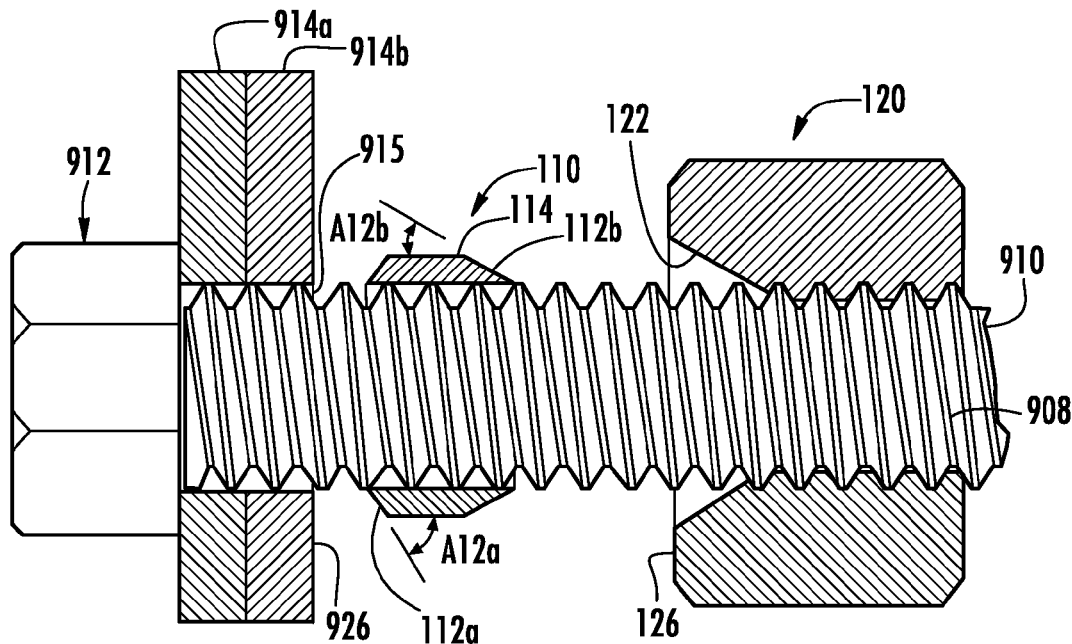
Figure 9:
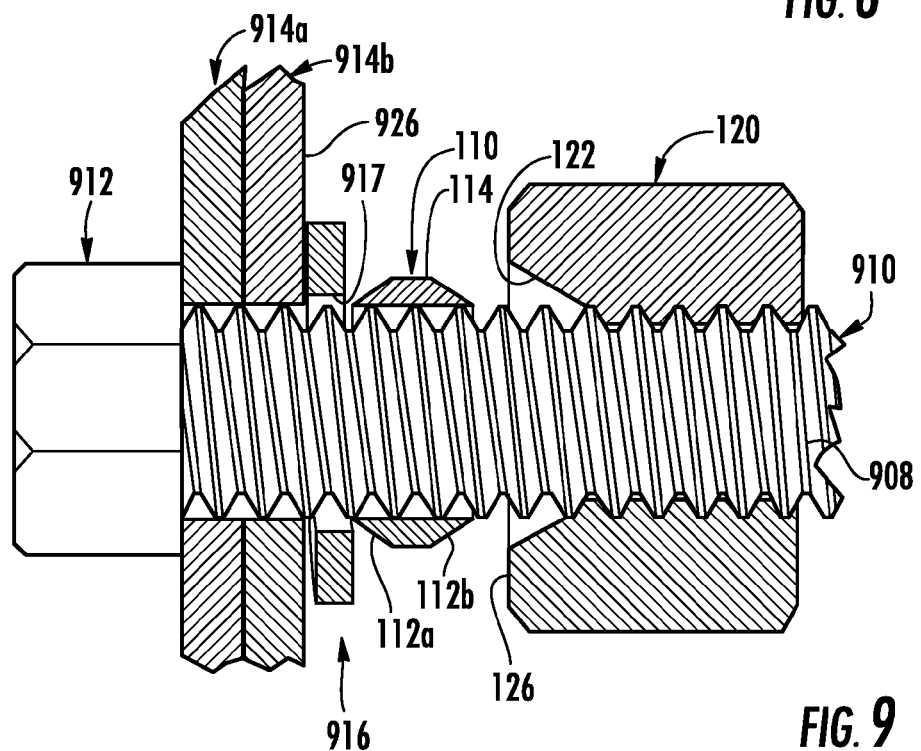

FIGS. 8-9 are cross-sectional side elevation views of a method of use of a ferruled locknut set embodiment that does not use a nut between the ferrule and the workpieces, all according to the invention.

Figure 10:
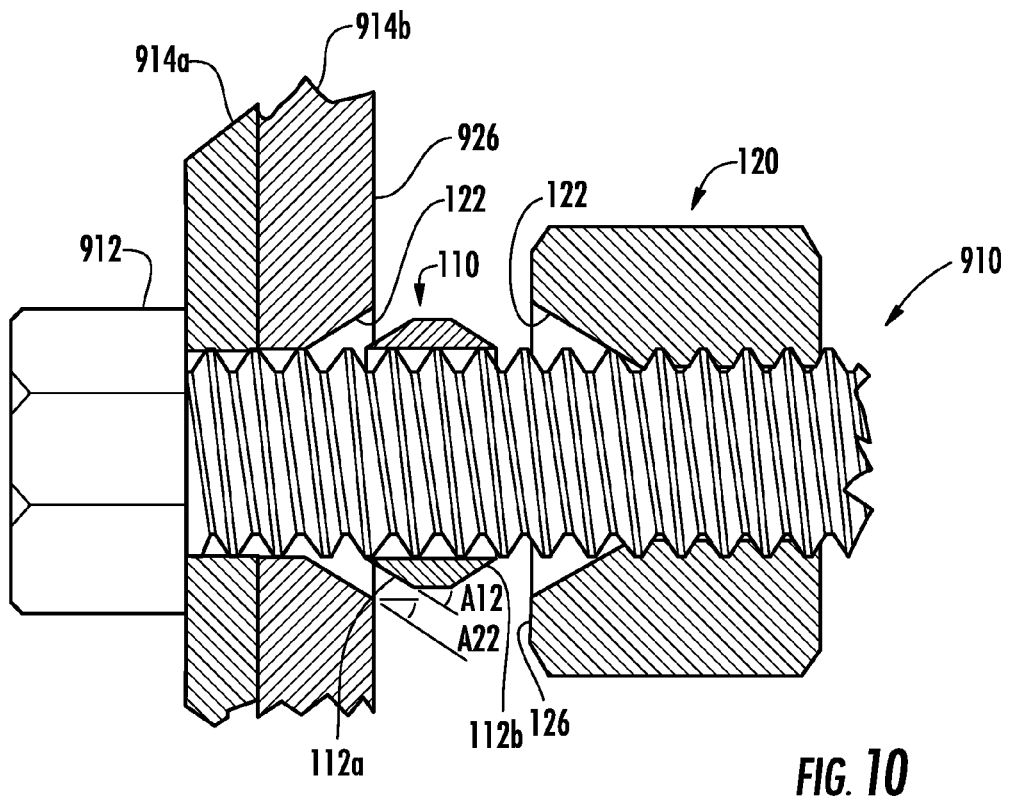

FIG. 10 is a cross-sectional side elevation view of a method of use of a ferruled locknut set wherein a workpiece is modified, according to the invention.

Figure 11:
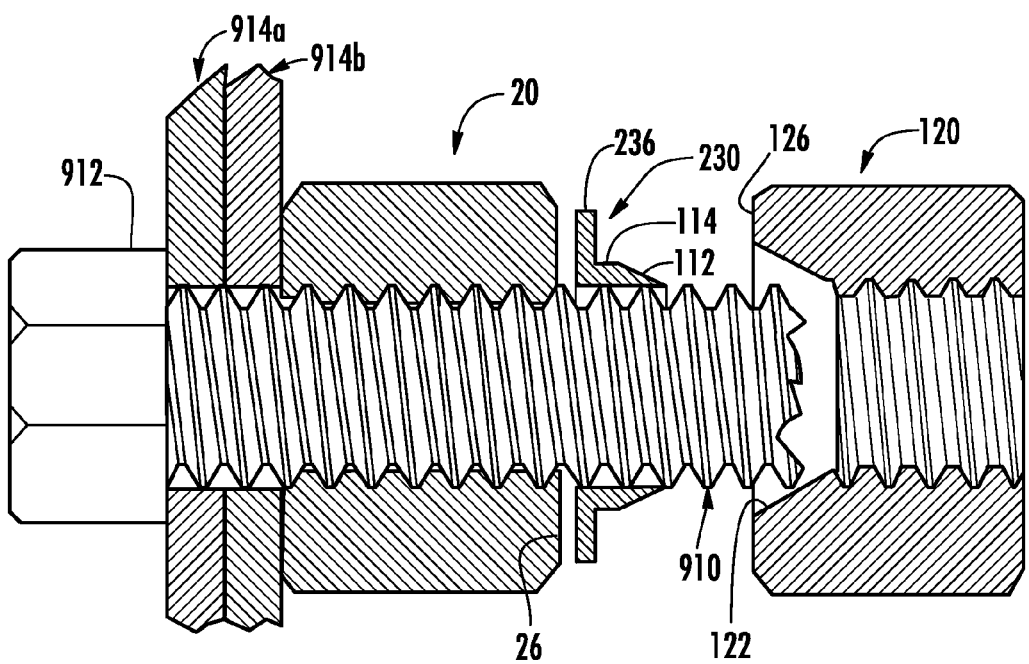

FIG. 11 is a cross-sectional side elevation view of a method of use of a ferruled locknut set embodiment that includes a ferrule with a flange, all according to the invention.

FIG. 12A is a perspective view of a locknut having a grooved cavity, according to the invention.

FIG. 12B is a cross-sectional side elevation view taken along the line 12B-12B, of the locknut embodiment of FIG. 12A, according to the invention.

FIG. 13A is a cross-sectional side elevation view taken as in FIG. 12B, but showing an embodiment of a tapered cavity having flute-like ridges that ramp inward, according to the invention.

FIG. 13B is an axial end view of the locknut embodiment of FIG. 13A, according to the invention.

FIG. 14 is a perspective view, partly cut away to show a ferrule locknut set embodiment using the locknut of FIG. 12A, assembled on a threaded rod, all according to the invention.

Figure 15A:
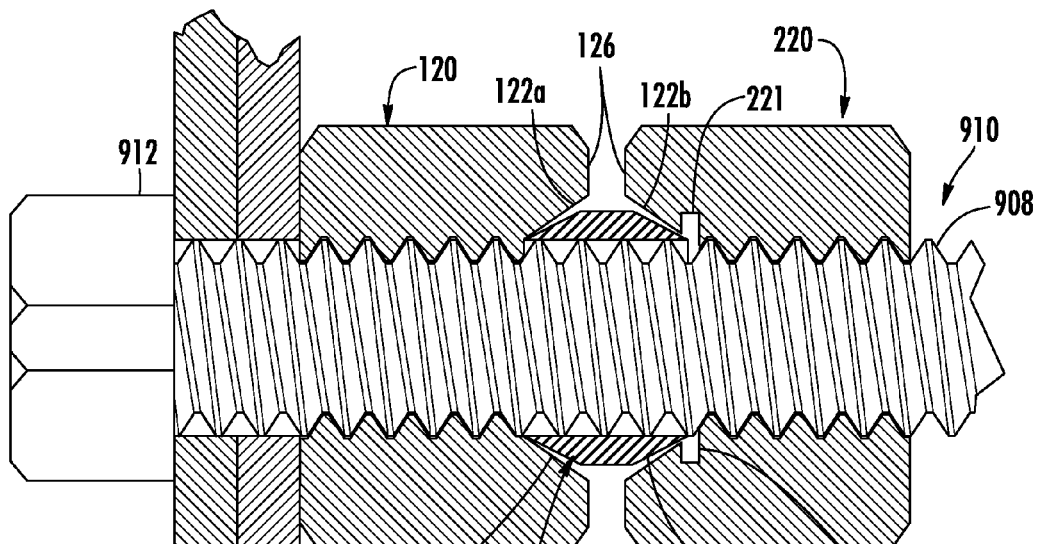
Figure 15B:
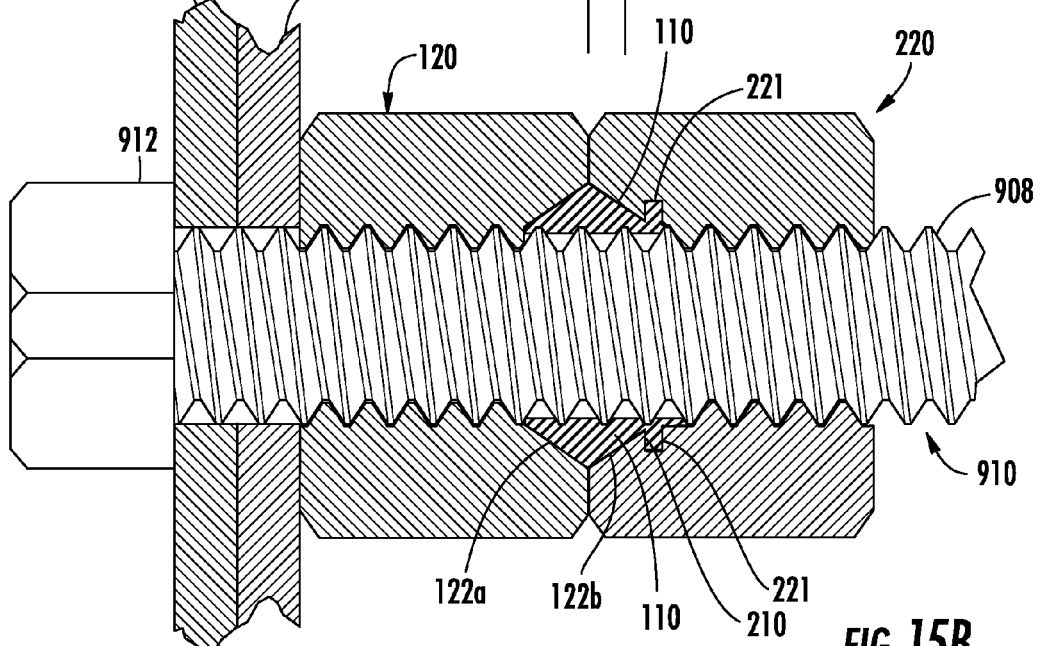

FIGS. 15A-15B are cross-sectional side elevation views of a method of use of a ferruled locknut set embodiment that uses the grooved cavity locknut of FIGS. 12A-12B, all according to the invention.

Figure 16:
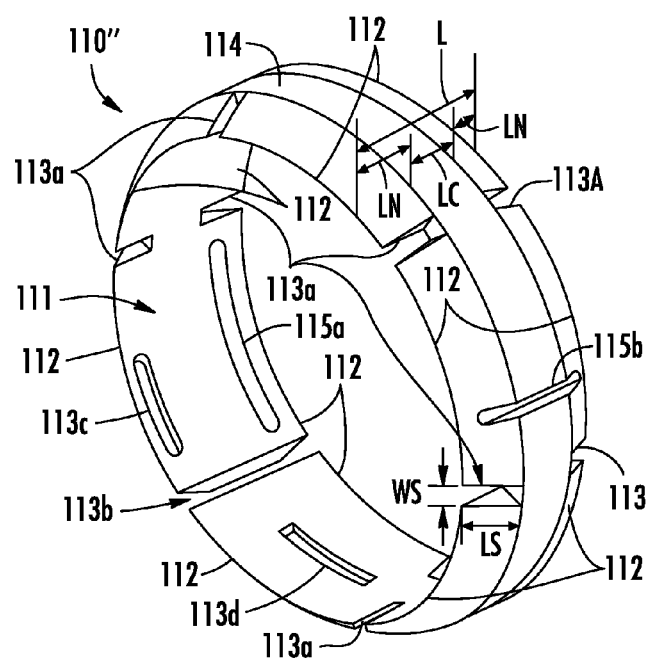

FIG. 16 is a perspective view of a ferrule showing a variety of ferrule modifications, all according to the invention.

Figure 17A:
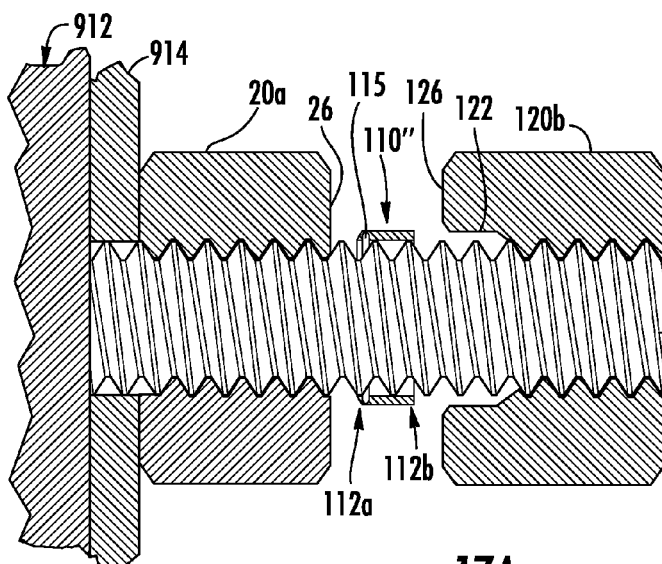
Figure 17B:
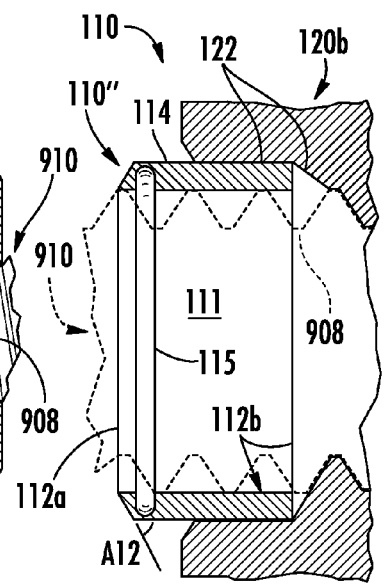

FIGS. 17A-17B are cross-sectional side elevation views, FIG. 17B being an enlarged portion of the FIG. 17A, showing a ferruled locknut set embodiment wherein the ferrule exhibits use of a circumferential groove, according to the invention.

Figure 18:
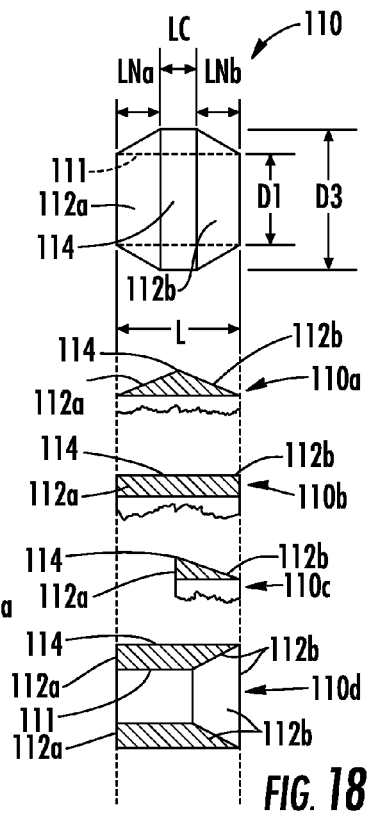

FIG. 18 is a side elevation view of a ferrule showing reference numerals, followed by partial side cross-sectional views of four ferrule embodiments exemplifying profile variations, all according to the invention.

DETAILED DESCRIPTION OF THE INVENTION

Generally speaking, the herein disclosed locking device is a new type of "lock nut"—a ferruled lock nut set 100 (i.e., a "kit") that includes at least one modified nut 120, 120' and a mating ferrule 110, 110', 110".

Referring to FIGS. 1-3B, some representative embodiments are illustrated. An inventively modified nut 120 has threads 124 that correspond to (i.e., mate with, are mated to) the threads 908 of a threaded rod 910 (e.g., rod portion of a bolt) on which the nut 120 is intended (designed) to be used. One face 126 of the nut has a tapered cavity 122 extending axially inward from the face 126 to a depth "E" where it transitions to the nut threads 124. An inside diameter D4 of the cavity 122 at the face 126 is made equal to or greater than an outside diameter (D3=D1) of a lengthwise end 112 of the ferrule (e.g., 110, 110'). The ferrules 110, 110' as shown in FIG. 1 have ends 112 which have tapered down from a centered collar portion 114 having, in this example, a maximum ferrule outside diameter D3, to a sharp edge where the outside diameter D3 becomes equal to the inside diameter D1 of the ferrule 110, which in turn is comparable to the outside diameter of the threaded rod 910 because the ferrule 110 is preferably close fitting on the threaded rod 910. Thus the tapered cavity 122 "tapers" from a larger opening down to the nominal thread diameter D2 at a depth E. The nominal thread diameter of the nut is nominally equivalent to the outside diameter of the mating threaded rod 910, therefore both are labeled as diameter D2. The cavity 122 may be referred to as "conical" or "funnel-like" due to the reduction of diameter, but the linear profiled cone shape shown in the illustrated embodiment of FIG. 3A is merely representative of a variety of shapes whose suitability will become more clear as the shape's purpose and function is further disclosed hereinbelow. In another embodiment shown in FIG. 3B a "wire drawing die" type of shape is illustrated. It can be seen that a nominal cavity wall 122 slope designated as a taper angle A22 has clear meaning in FIG. 3A, but with the curved profile of FIG. 3B the taper angle A22 varies with depth along a range as shown, so for irregular profiles the nominal taper angle A22 will be understood as an approximation, for example an average, or for example, maybe the angle at the cavity opening in the face 126 of the nut 120.

Where it is desirable to meet a Fastener Standard (e.g., a specified tensile strength of the nut threads), the modified nut 120 is formed from a nut body having an extended axial thickness sufficient to maintain a threaded portion 124 of the nut that is in accord with requirements of the Fastener Standard strength specification. For example FIG. 3A shows a threaded portion 124 of the nut 120 having the same thickness T of a nut meeting the standard, plus an added body thickness E to accommodate the depth E of the tapered cavity 122.

In embodiments shown in FIG. 1 (more will be presented hereinbelow) the ferrule 110, 110' has a tapered nose on both lengthwise ends 112 such that the taper profile of the end 112 mates with the tapered cavity 122 in the nut 120. (See FIG. 6B for an example of this wherein the ferrule end taper angle A12 equals the cavity taper angle A22.) The shape and dimensions of the mating tapered portions are such that a predetermined amount of pressure on a joint of the mating tapered portions 112, 122 (e.g., from screwing torque applied to the nut 120) will cause the ferrule 110 to be crimped (or swaged) against the threads 908 of the threaded rod 910, i.e., radially squeezed all around the rod by distorting the ferrule end 112 in the direction of reducing its circumference and diameter.

In the disclosure hereinbelow we will discuss advantages and disadvantages of various shapes and dimensions for ferrules 110, 110' and the like. It may be noted that the inventive ferruled locknut system/set/method (e.g., 100) does not require tapered ends 112 on the ferrule (e.g., 110, 110'). For example, in the next set of drawings (e.g., FIG. 4B) the ferrule 110 has a different ferrule end taper angle A12 magnitude than the cavity taper angle A22.

The offset view of the ferrule 110' shows that it is threaded, i.e., the ferrule's axial bore 111 has threads 124 mated to the threads 908 of the rod 910. The ferrule body 114 (e.g., a middle portion) can advantageously have some type of gripping feature such as, for example, knurling as shown, so that the threaded ferrule 110' can be hand tightened against a first nut (e.g., 120) in a locknut pair. Other examples of gripping features 114 include, but are not limited to: hex flats, two wrench flats, prong-notches or cavities, and so on.

FIGS. 4A-4D illustrate a method of use for the ferruled locknut set 100 that is illustrated in FIG. 1. It will be seen that this method, which employs a ferrule (e.g., 110) and a cavity nut (or locknut) (e.g., 120), both important elements according to the present invention, is an effective method of preventing (or at least significantly resisting) movement of a nut away from a set position on a threaded rod 910, i.e., providing a vastly improved form of "locknut". Although the ferruled locknut set 100 could be used to simply hold two nuts in a set position anywhere on a threaded rod 910 (e.g., as shown in FIGS. 2A, 2B), most of the usage examples in the present disclosure show what is expected to be the most common use wherein a nut is used to clamp one or more workpieces 914 (e.g., metal sheets or bars, a flange or bracket, etc.) together on a bolt, or mounted on (removably affixed to) a massive object like a machine base or other immobilizing component 912 that has a threaded rod (stud) 910 extending therefrom. Be it a bolt head (e.g., bolt with head in FIG. 4A) or a massive object (e.g., a bulkhead in FIG. 17) the immobilizing component 912 provides a clamping counterpart for a nut on the rod such that the workpiece(s) 914 are positioned for clamping between the immobilizing component 912 and the nut (e.g., a generic or "regular" nut 20 as in FIG. 17) which is then torqued sufficiently to provide a desired clamping force F1/F1r. Typically a second generic nut 20b is used as a "locknut" by torquing it against the first nut 20a. So far, this process is a common method for fastening something, and as discussed in the background, the common method is often insufficient for the user's needs/desires. The present invention provides a much more secure form of "locknut", or more generally stated, a locking device/system/method for nut-and-bolt type fasteners (bolt meaning a threaded rod 910, preferably, but not necessarily, with an immobilizing component 912 affixed to one end of it).

Figure 4A:
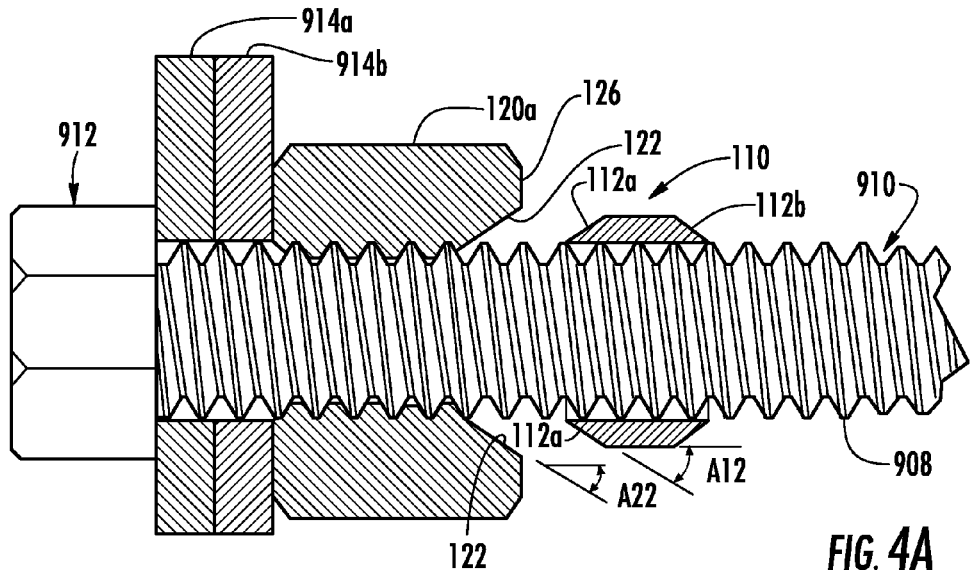
Figure 4B:
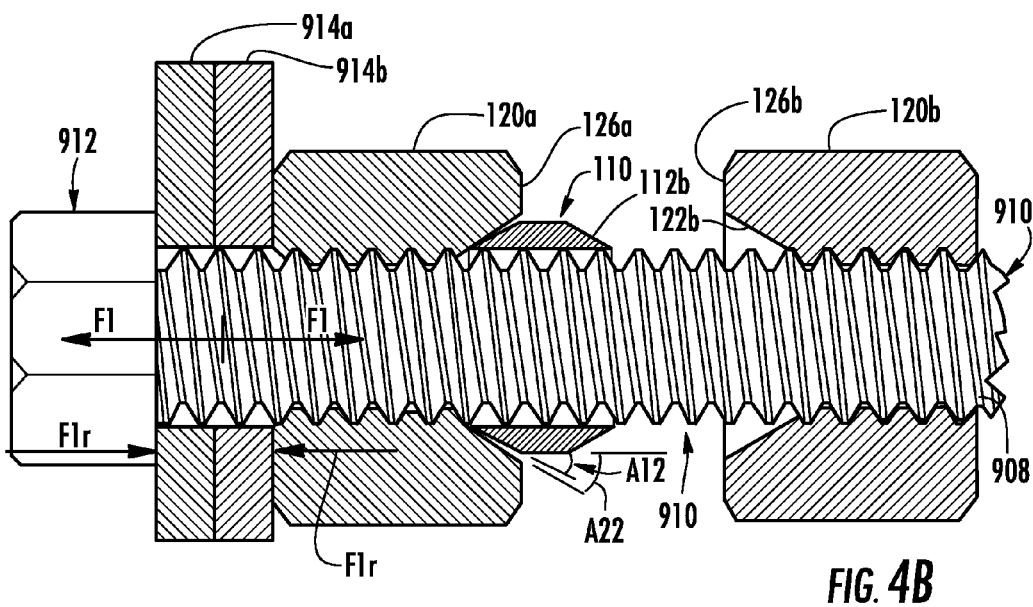

For example, FIGS. 4A and 4B show a first nut (in this example a cavity nut 120a) after it has been threaded onto the threaded rod 910 (of a bolt), and torqued as desired against the bolt head 912 thereby clamping two workpieces 914a, 914b with a desired clamping force F1r which is the equal force in a reverse direction from the tensile force F1 which is tending to stretch the threaded rod 910. It should be clear that this clamping function does not require a cavity nut 120 since it can be performed by any generic nut 20. The inventive locking device 100 comes into play after this clamping function is performed, which establishes a set position on the threaded rod 910. Since the established clamping force is directly dependent on the set position of the nut 20, 120; and since movement of the components (e.g., workpiece 914 being moved by vibration), a locking device such as a locknut is desirable if not critical depending upon the usage.

Figure 4C:
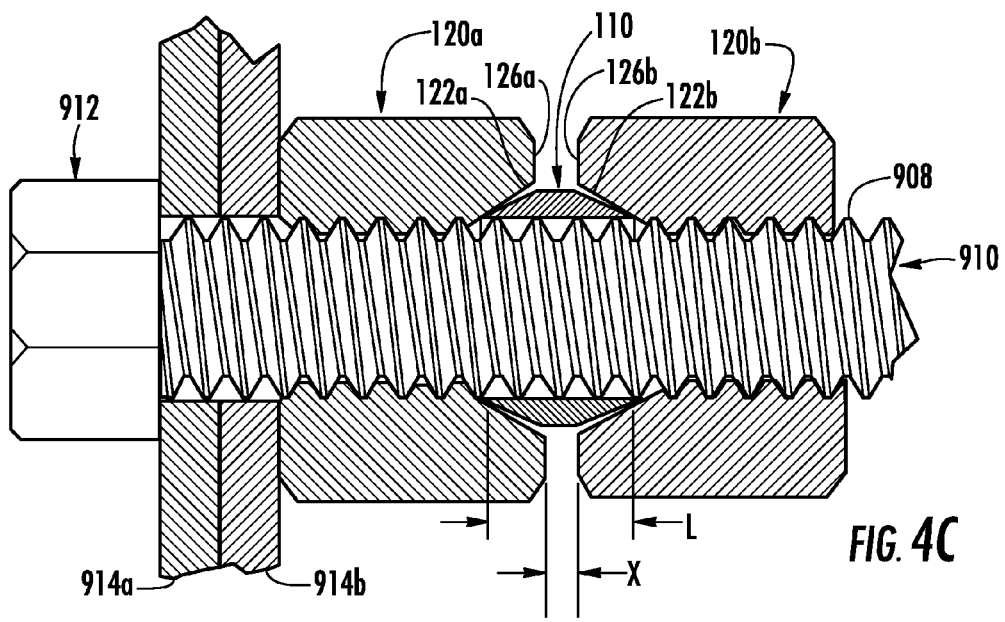

To continue the illustrated example wherein a cavity nut 120 is used as the first nut 120a; it can be seen that to be involved in the locking function, the tapered cavity 122 (122a in the first nut) faces "inside" the locking device 100 where the other components will be positioned. Thus the cavity nut's face 126 becomes an inside face 126a on the first nut 120a. Next, the ferrule 110 is positioned on a threaded lengthwise portion of the rod 910 such that a first end 112a of the ferrule 110 is facing the inside face 126a of the first nut 120a. A second nut (e.g., cavity nut 120b) is threaded onto the threaded rod 910 so that an inside face 126b of the second nut 120b is facing a second end 112b of the ferrule 110 that is distal to the first end 112a Like the first nut 120a, the second nut 120b is oriented such that the nut's cavity 122b is in the nut face 126 that becomes the inside face 126b of the second nut 120b. Referring to FIG. 4C, the first nut 120a, the ferrule 110, and the second nut 120b are positioned on a threaded lengthwise portion of the rod 910 such that the first and second nuts 120a, 120b, respectively, contact the first and second ferrule ends 112a, 112b, respectively.

Figure 4D:
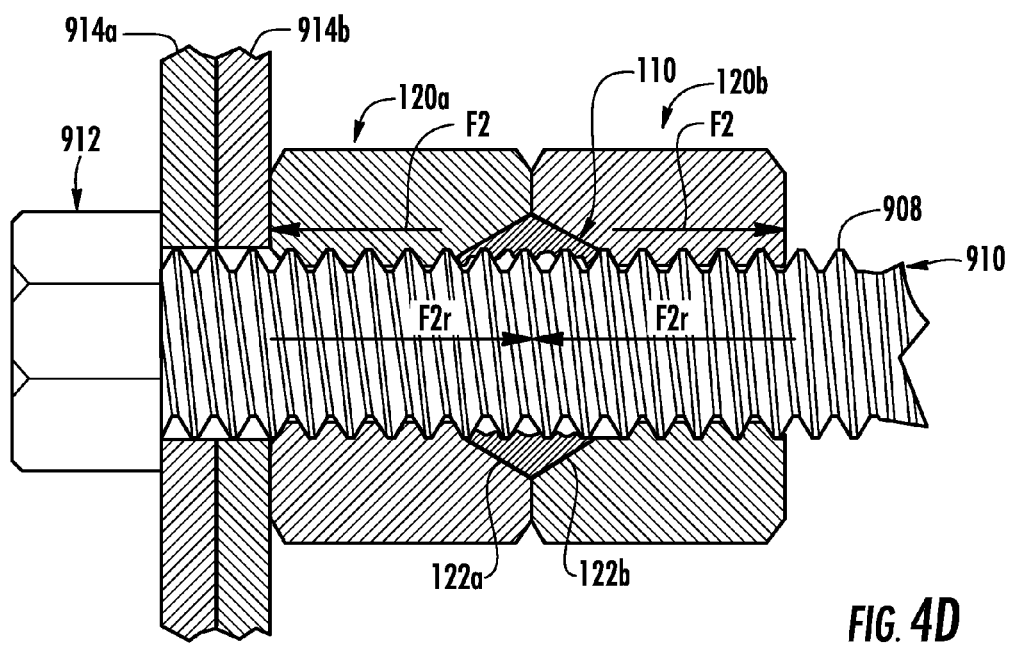

Because of various design factors such as the ferrule's overall axial length L, when the second nut 120b is thus made "finger tight" on the ferrule 110 the nut faces 126a, 126b have a suitable separation distance X, the suitability being that X is a distance such that when the second nut 120b is forcibly tightened (torqued) to make the nut faces 126a, 126b meet as shown in FIG. 4D (i.e., separation distance reduced to essentially zero), then the ferrule 110 should be crimped sufficiently to create a designer-specified locknut holding force magnitude which has been predetermined by the ferrule and nut designer who determined the proper combination of the shape and dimensions and material of the ferrule 110, the nut 120, and its cavity 122. Of course the design will also be influenced by given features and requirements such as threaded rod diameter D2 and thread profile, the fastener usage requirements, applicable fastener standards and specifications, and probably other factors like the threaded rod material, etc.

Because of considerations such as these, it is desirable to sell fasteners as a "kit" or matched set 100 which includes, for example, at least one cavity nut 120 matched with one ferrule 110, thereby assuring the user that the fastener set 100 has been optimized by design to work together to meet a particular standard of performance when used with a particular type of threaded rod 910 in specified usage. To meet tighter specifications and/or more severe usage conditions it may be desirable to include the specified threaded rod (typically a bolt) 910.

In the final step (FIG. 4D), the first and second nuts 120a, 120b, respectively, are torqued together with sufficient force to "crimp" the ferrule against the threads 908 of the threaded rod 910. In this illustrated example, torquing together means forcibly tightening the second nut 120b against the ferrule 110 and the first nut 120a which is already in an effectively immovable set position.

The term "crimp" is used somewhat generically to mean distorted in a way that moves the material of the ferrule 110 in a shape changing, material displacing manner which squeezes ferrule material away from an overly-confined portion of the cavity 122 into any available open space, such as being compressed tightly against the threads 908, and if enough force is applied, down into the threads 908, as shown. This is like swaging or wire drawing through a die, especially given the generally funnel-like shape of the tapered cavity (walls) 122. However, it will be seen from the description hereinbelow, that distortion and material movement of the ferrule during crimping is affected by many factors which can be advantageously varied in the design of various embodiments of ferruled locknut sets 100. All of the embodiments illustrated herein are believed to be within the scope of the present invention(s) as claimed because all of them involve at least one cavity nut 120 and a ferrule 110 which is crimped against the threaded rod 910 when an end 112 of the ferrule 110 is sufficiently forced into the tapered cavity 122 of the nut 120. Whatever is eventually determined to be the essential elements of the invention(s), variations and additions to the physical components or the method of use that don't eliminate any of the essential elements of the invention are considered within the scope of the present invention.

The locknut holding force is determined by a number of factors including the force/reaction force vectors F2/F2r shown in FIG. 4D. In reaction to the compressive crimping, the ferrule 110 is pushing the two nuts apart, while the threaded rod 910 reacts to tensile force applied by the nuts to the threads and pulls the nuts together. Although not illustrated, it can be seen that there is also a radial component to the forces around the compressively crimped ferrule 110, thereby providing extra force against the threads of the threaded rod 910 and against the wall of the cavity 922 that is really a surface of the nut 120.

Another factor in holding force can be seen by comparing FIGS. 4C and 4D: the ferrule 110 has been distorted by the crimping such that it greatly increases its contact area with the nut and threaded rod. The contact area is very limited at first, contact being at the outermost points of the ferrule ends 112 where they first touch the cavity wall and at some portions of the threads' outermost tips wherever the "close fitting" but still easily movable ferrule bore 111 happens to scrape against or rest upon them. After crimping, the ferrule 110 has distorted enough to contact a large portion, if not all of the cavity wall 122, and has established intimate contact all around the outside of the threads plus at least some of the sides of the threads.

Friction is proportional to both surface area of contact and to perpendicular force magnitude, therefor the magnitude of friction forces that will counteract any attempt to rotate either one of the nuts has been greatly increased in a mostly irreversible way since the ferrule material has been rather permanently deformed. This greatly increased friction is in addition to the usual friction provided by locknuts which, when their inside faces are torqued together, produce axial force vectors similar to the F2/F2r vectors, and these forces cause the inward side of the threads 908 to pull inward (F2r) against the outward faces of the nut threads that are being pushed outward (F2) by contact pressure between the nut faces. Thus there is friction between each nut and the threaded rod. Furthermore, there is friction between the nut faces 126a, 126b that is proportional to the surface area and the amount of torque that applied force of the second nut face onto the first nut face. Here there is somewhat of a tradeoff since the cavity or cavities 122 reduce the surface area of the nut face, and also the face to face force is only whatever amount exceeds the force needed to hold the ferrule 110 in its compressed/crimped state. It may be noted that the face-to-face contact area provides frictional resistance to movement of one nut relative to the other, while the forces acting on the nut-to-thread contact area resist any movement of the nuts relative to the threaded rod, whether they move together or separately. However, the crimped ferrule 110 bridges the boundary between nuts, and thereby simultaneously provides frictional resistance to any movement of the nuts relative to the threaded rod and relative to each other.

Another interesting note: the force component between nut faces acts on the first nut 120a to threaded rod 908 interface in a direction opposed to that of the clamping force F1/F1r. Speaking in terms of directions as seen in the drawings of FIGS. 4B and 4D, the first nut torqued against the workpieces 914 and bolt head 912 creates a force F1 that uses the right side of the first nut's threads to pull the threaded rod toward the right of the workpieces 914 (and bolt head 912) while pushing the workpieces to the left with equal force F1r. Thus friction is created in proportion to the amount of the force F1/F1r that is applied to the right side of the first nut's threads. At the same time, the second nut torqued against the first nut creates a force F2r that uses the second nut's threads to also pull the threaded rod to the right while pushing the first nut to the left with equal force F2. However, pulling the threaded rod by the second nut means that the force F2 is being applied by the rod threads toward the left side of the first nut's threads. This means that application of the ferruled locknut 100 to a clamping nut (e.g., first nut 120a) tends to reduce the frictional resistance to rotation of the first nut on the threaded rod while increasing the frictional resistance to movement of the first nut relative to the second nut and to movement of the second nut relative to the threaded rod. It also tends to reduce the frictional "grip" of the workpieces on the first nut.

Thus it can be seen that there are many ways to vary the performance and functional behavior of the ferruled locknut system 100 such that an engineer/designer can optimize structure and method of use to produce a wide variety of ferruled locknut kits designed for a wide variety of usage conditions.

Figure 6A:
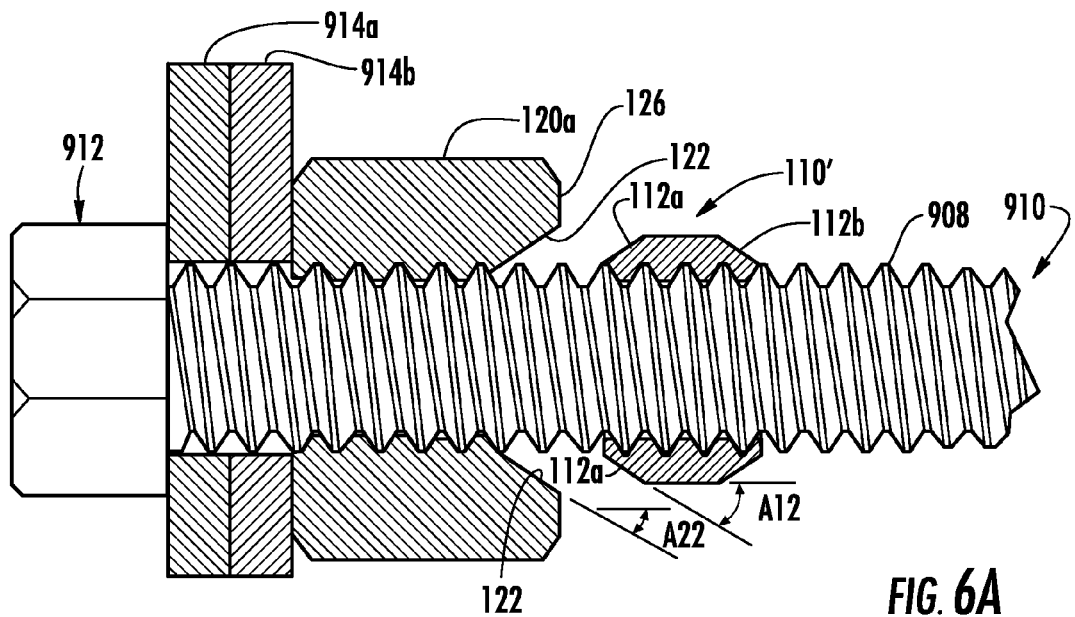
Figure 6B:
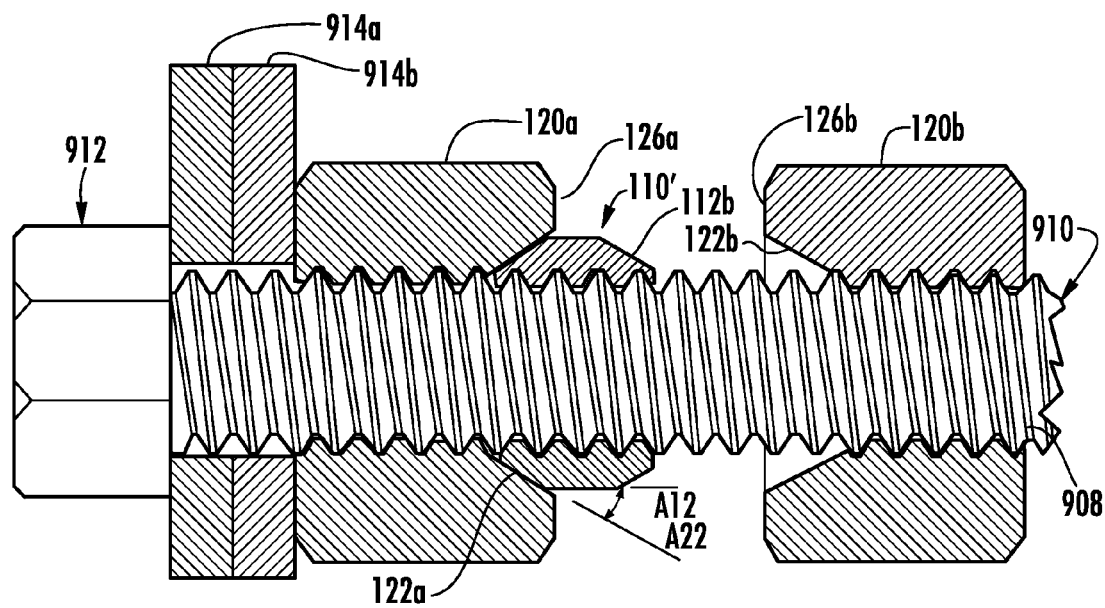
Figure 6C:
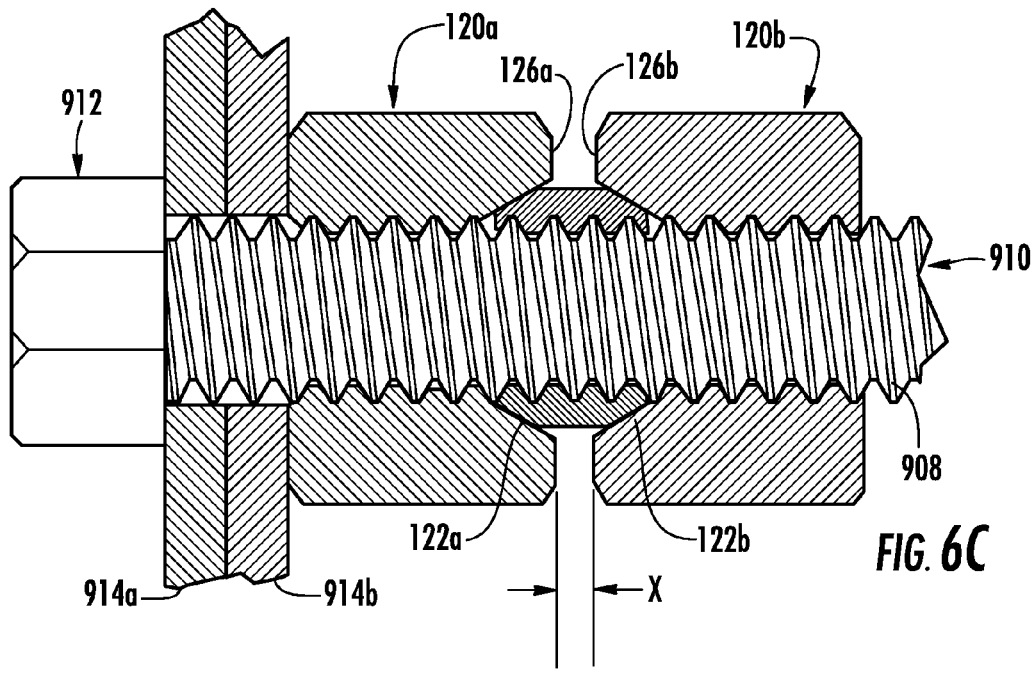
Figure 6D:
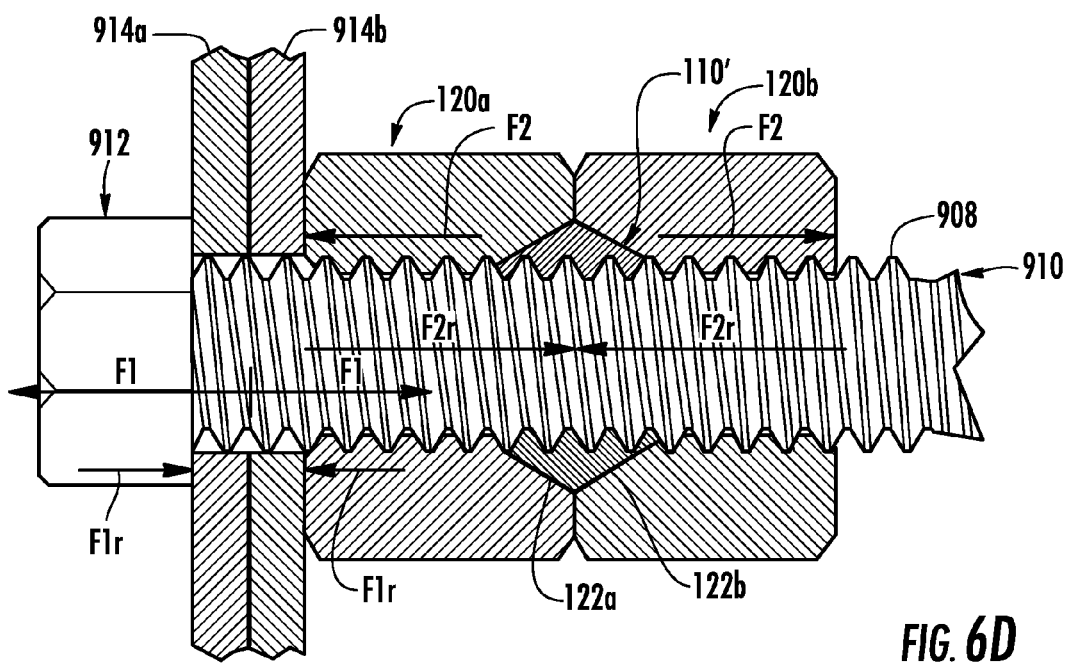

FIGS. 6A-6D illustrate substantially the same method of use as described above, but slightly adapted for use with a threaded ferrule 110', a variation of the ferrule 110 wherein the ferrule bore (still ID of D1) has threads 124 mated to the threads 908 of the threaded rod 910 (OD of D2) as shown in perspective view in FIG. 1. The FIG. 6A shows a first nut 120a that is screwed onto a bolt 910 (threaded rod with a head 912), and tightened against the workpiece(s) 914 of the joint to be clamped. The first nut 120a is tightened (e.g., by a suitable wrench which may be a torque wrench if precise specs must be met) to a specified (desired) torque per usual practice for nuts 20 clamping a joint. Next the threaded ferrule 110' is threaded onto the bolt 910 and hand tightened to position it against the first nut 120a (i.e., a first ferrule extension/end 112a is advanced into and up against the cavity wall 122 as shown in FIG. 6B). To assist hand tightening the threaded ferrule 110', the ferrule body 114 can have some type of gripping feature such as, for example, knurling as shown in FIG. 1. In the next step, shown in FIG. 6C, the second nut 120b is screwed onto the bolt 910 until it is hand tightened against the threaded ferrule 110' (i.e., the second nut 120b is advanced such that the tapered cavity 122b of the second nut 120b surrounds the second ferrule end 112b, axially distal to the first end 112a, and stops with the end 112b up against the cavity wall 122b). The ferruled locknut set 100 is designed such that this hand tightening will result in the two nut faces 126a and 126b still being separated (not touching each other), e.g., a separation distance X. Finally the second nut 120b is tightened a specified amount on the threaded ferrule 110', and possibly also against the first nut 120a. In an embodiment, for example, the specified amount of tightening could be "¼ turn" (one quarter turn, i.e., 90 degrees). In another embodiment, for example, the specified amount could be "until the two nut faces touch", and/or until a specified torque value is achieved.

When first tried, the threaded ferrule 110' was expected to produce a stronger locknut holding force due to its threads 124 that were already extended most of the way into the threads 908 (FIG. 6C) which, when crimped, should yield pressure on much more surface area of the threads 908 than for the unthreaded ferrule 110 (compare FIGS. 4D to 6D). However my testing showed that although it is effective as a locking device, the threaded ferrule 110' may not be as good in general use as the unthreaded version 110 because of a different behavior it exhibits. At least with the component materials tested so far, the threaded ferrule 110' tends to be swaged more on the back end 112b than the front end 112a because the second nut 120b is crushing (crimping, swaging) the back end 112b of the threaded ferrule 110' while simultaneously trying to turn the threaded ferrule 110' to advance it along the bolt threads 908 into the cavity 122a of the first nut 120a, so that the front end of the ferrule 112a can then be swaged.

On the other hand, these issues are more of a problem in the situation described than they would be for a locking device application that only crimps one end of the threaded ferrule 110'. In the disclosure hereinbelow (e.g., FIGS. 7A, 7B, 11) we will present some ferruled locknut 100 applications that may benefit from use of a threaded ferrule 110'. Also, referring to FIG. 6B, the cavity nut 120a is shown with a threaded ferrule 110' hand tightened into intimate contact with the cavity 122 (especially possible because the taper angle A12 of the ferrule end 112a is closely matched to the taper angle A22 of the cavity wall 122). Given that the threads 124 of the threaded ferrule are mated with the bolt threads 908, it should be possible to hold the ferrule 110' in a set position on the threaded rod 910 while the cavity nut 120a is torqued against it. The farther the cavity nut 120 is forced over the threaded ferrule 110' the more it will be crimped to fill the bolt threads 908 and thereby supply increasing frictional resistance to movement of the ferrule 110' away from the nut 120. It may require a stronger gripping feature than knurling on the ferrule body, but wrench flats, prong holes or the like on the ferrule body 114 could easily do the job. This combination of a ferrule and one cavity nut could be used to establish a set location along the length of a threaded rod 910. An example might be to use this particular embodiment of a ferruled locknut as stops to support spaced apart crossbars on a long hanging threaded rod.

In general, however, the threaded ferrule 110' tends to make the locking device 100 more difficult to assemble or remove. First of all, the threaded ferrule 110' requires an extra operation to assemble—that of properly engaging the ferrule threads 124 with the bolt threads 908 and then hand tightening all the way to the first nut 120a (or regular clamping nut 20a). Secondly, when crimped, the threads of the ferrule 110' tend to completely fill at least a part of the bolt's thread 908, which makes unscrewing it difficult (an advantage for holding the first nut's position, but a disadvantage when removal of the nuts is desired).

FIG. 5 illustrates a way to add more locknut holding strength by increasing the friction between nut faces 126. Shown are two cavity nuts 120' that have a high friction surface feature—in this embodiment being an unscrewing resistant face 126', e.g., interlocking radial serrations having a ramped sawtooth shape for interlocking with complementary mating ramps on a mating nut 126'. The ramped serrations are oriented to only allow tightening rotation of one nut face 126' against the other face 126'. Other ferruled locknut set 100 embodiments wherein friction is increased between nut faces (e.g., 126, 126', 26) are also illustrated in FIGS. 9 and 11, described hereinbelow.

Various prototype Ferruled Locknut sets 100 have been tested on an Instron and in a rigorous standardized "Junker Fastener Vibration Test." So far, tests of limited sample size have yielded excellent results, far exceeding minimum mil specs for security of threaded fastener joints. It may be noted that tests of an earlier experimental locknut pair that had only the modified nut face 126' (but no ferrule or cavity) produced unsatisfactory Junker test results, therefor the most significant features of the present invention are believed to be the ferrule 110 and cavity nut 120 sets according to the present disclosure.

Successfully tested prototypes include both stainless and brass ferrules 110 with stainless steel cavity nuts 120 made by cutting the tapered cavity 122 in a ¼-20 nut for use with a corresponding (mating) ¼-20 bolt (threaded rod) 910. Other materials are expected to work as well as, maybe even better than the first prototype. For example, a hard metal cavity nut and bolt may be combined with ferrules 110 made from various softer materials in order to enhance the crimping/swaging effect. For example, plastics and composite materials may be advantageous.

Different ferrule and cavity shapes continue to be developed to optimize the design for various applications and threaded rod sizes. For example, referring to FIG. 18, the overall length L of the ferrule 110 and other lengths and diameters as shown can be varied relative to the cavity shape and depth (E) to vary the amount of ferrule material involved in the crimp deformation and the degree of swaging/crimping that occurs. As shown in FIGS. 2A and 2B, such variations can mean the difference between completely filling the cavity space with the crimped ferrule 110 material versus partially filling it.

We now present additional embodiments and variations of the ferruled locknut 100 device and fastening method.

Referring now to FIGS. 7A-7B, what could be called a single-ended ferrule 110 is shown being used to secure a cavity nut (locknut) 120b against a regular nut 20a that is torqued onto the workpieces 914 being fastened (clamped) together. The locknut 120b is substantially equivalent to previously described locknuts 120b, having a face 126b and a cavity 122. The regular nut has a face 26a. Both nut faces 26a, 126b are oriented to face the ferrule 110 as "inside" faces. When the locknut 120b is finger tight on the ferrule 110 the inside faces have a suitable separation distance X that may be different from the separation distance X for a double ended ferrule 110 (being used between two cavity nuts 120), the suitability being a distance that swages the ferrule 110 enough to create a desired holding force when the second nut 120b is tightened to make the faces meet as shown in FIG. 7B. As stated hereinabove, other criteria may be used to indicate a suitable amount of crimping.

FIGS. 8, 9, and 10 show examples of some other fastening method embodiments that may be useful, for example, in decreasing expense by eliminating the first nut 20a, 120a so that only a ferrule 110 and one cavity nut 120 are used to tighten against the workpiece(s) 914 and/or the immobilizing component 912. FIG. 8 shows use of a ferrule 110 that has a first slope (taper angle) A12a on the first ferrule end 112a that is greater (larger angle, steeper) than the slope A12b on the second ferrule end 112b which is used with the locknut cavity 122. Angles and the length of the ferrule center portion 114 can be adjusted to suitable values when they are tested, but it is anticipated that the steeper slope on the front end might be partly crimped into the through hole 915 as the ferrule 110 is crimped against the face 926 of the workpiece.

FIG. 9 shows a similar application wherein a washer or lock washer 916 is inserted between the workpiece 914b and the ferrule 110. In this example, the washer 916 has a larger center hole 917, so a longer ferrule end 112a is used to be crimped more into the hole 917 and against the bolt threads 908 within. Again, ferrule 110 dimensions may need adjustment.

FIG. 10 shows a similar application (without washer) wherein the inside workpiece 914b has a tapered cavity 122 that has been countersunk into its inside face 926 (e.g., during assembly of the joint), such that the workpiece cavity 122 will be used to swage/crimp the ferrule 110 where it is pressed into it. Since the example shows a workpiece cavity 122 that is substantially equivalent in shape and dimensions to the cavity 122 of the cavity nut 120, then both ferrule ends 112a, 112b may be able to use the same shape and dimensions as each other.

It may be recognized by the knowledgeable reader that the single nut embodiments are likely to be less effective than the full double-nut embodiment, however the single nut version may be adequate for use in less demanding applications. Alternatively, in certain cases it may be desirable to use a ferrule 110 with a first cavity locknut 120 the way it is used in FIG. 10, for example, but then securely locking all of that in place by using a second ferrule 110 and cavity locknut 120 on the other side of the first cavity locknut 120. This would be the most secure if the second ferrule 110 were to be crimped on both ends by facing tapered cavities 122, as in FIG. 4D. A convenient way to do this is to make the first locknut 120 as a double-cavity locknut 120, i.e., having two tapered cavities 122 on the axially opposed faces 126 of a single nut. Referring to FIG. 3A, such a nut is easily visualized wherein the double cavity nut has a sufficient axial length to allow for an adequate threaded portion length T between the two cavities 122, each of depth E.

Referring to FIG. 9 again, it may also be noted that the lockwasher 916 in the nut-to-work surface joint, could be considered helpful by increasing friction between the workpiece surface 926 and the nut face 126, but further consideration and/or testing may show that this is undesirable. For example, a workpiece 914 may be resilient such that the clamping torque specified for the first nut is relatively light or even just finger tight. In this case the joint holding capability is entirely controlled by the locknut set's ability to hold itself locked and fixed at a set position on the threaded rod 910.

FIG. 11 shows a flanged ferrule 230 that is similar to a single ended ferrule 110 (FIGS. 7A-7B) except that a washer-like flange 236 extends radially outward from the non-tapered end of it. As in FIG. 7B this flanged ferrule 230 can be used, as shown, with a regular nut 20a and a cavity nut 120b which will torque against the face 26 of the first (regular) nut 20a while crimping (swaging) the end 112 of the ferrule 230 inside the cavity 122. As this happens, the flange 236 will be compressed between the nut faces 26 and 126. The flange 236 may have a variety of axial face characteristics as suitable for different purposes and/or uses. For example, both faces (left and right as shown) could have a rough texture to increase frictional resistance to unscrewing the locknut 120b. For example, the flange 236 may be fashioned like a lock washer (compare FIG. 9). For example, the left face could be polished, Teflon coated, and the like to make a slippery surface for placement against a workpiece surface 926 when a first nut is not used (as in FIG. 8). This would allow the ferrule end 112 to crimp and lock inside the second nut cavity 122 while at the same time minimizing unscrewing forces that might come from contact with a vibrating workpiece 914, for example. If the flanged ferrule 230 has threads 124 like the threaded ferrule 110', then this may work even better.

FIGS. 12A-14 illustrate a ferruled locknut system (set, kit) 100' embodiment with a modified cavity locknut 220 wherein the cavity wall 122 has a radially outward/inward extending groove 221a/ridge 221b respectively. These two cavity wall modifications may be referenced collectively as features 221. FIGS. 12A, 12B and 14 illustrate an example of an annular groove 221a cut radially outward in the cavity wall 122. FIGS. 13A, 13B illustrate an example of a cavity wall 122 having four flute-like ridges 221b that extend radially inward an increasing amount as the cavity depth increases. In other words, the peak of each ridge 221b ramps radially inward from the cavity wall 122 at a much steeper cavity taper angle A22' than the rest of the cavity wall's taper angle A22. (FIG. 13A shows the two angles together for comparison of magnitude, while FIG. 13B shows the different lines along the cavity where the two angles are measured.) The system 100' is otherwise substantially the same as previously described systems 100. The modified cavity locknut 220 is best seen in cross section as in FIGS. 12B and 13A, both cross-sections being taken along a line such as the line 12B-12B shown in FIG. 12A.

The annular groove 221 can be, for example, a square-U shape as shown, a rounded bottom, and the like; but preferably it has a sharp or squared-off (not beveled) edge transition at the cavity wall 122 of the nut 220. The groove 221 is axially (longitudinally) positioned preferably close to the start of the nut's threads 124 and concentric about the nut's axis (not pitched like the threads). FIG. 14 is a perspective cutaway view of the grooved cavity system 100' showing the result of tightening the locknuts 120 and 220 according to the invention. A locking ridge 210 is formed by material of the ferrule 110 that is squeezed outward into the groove 221 as a result of being swaged by the tapered cavity wall 122 of the grooved locknut 220. The ridge 210 provides an added locking mechanism for holding the grooved locknut 220 in position relative to the bolt threads. This provides a physical hook that resists pulling the cavity 122 of the grooved locknut 220 back away from the crimped ferrule 110—disengaging the second locknut 220b from being locked against the first locknut (e.g., 120a). Since the nut 220 must be unscrewed to move axially away from the ferrule 110, another effect of the groove 221 is to increase surface area of contact between the nut and ferrule where the crimped ferrule 110 has been extruded into the groove 221 to form the locking ridge 210 as shown. This will add frictional resistance against rotating the crimped ferrule 110 relative to the cavity wall 122 and therefor relative to the nut 220. This increase adds to the friction between the crimped ferrule 110 and the rest of the cavity wall 122.

Similarly, the axially directed ridges 221b will provide a very effective block against rotational movement of the locknut 220 relative to the crimped ferrule 110. An additional effect, at least for ridges 221 that flute the cavity wall 122 such as these do, is that the ridges' steeper cavity taper angle A22' alternates with the wall's taper angle A22 to cause a fluted or corrugated crimping pattern in the ferrule 110 when it is crimped.

Given this teaching, it can be seen that the grooved locknut 220 can be advantageously used for either or both of the first and second locknuts (cavity nuts) 120, as well as in any of the other embodiments and configurations of the inventive "Ferrule-Lock" fastener 100 and methods of its use. Furthermore, it can be seen that the groove 221 will perform the described function even if it is only a portion of an annulus (not fully circumferential) and even if it is irregularly shaped and oriented in the cavity wall (e.g., reverse spiral versus the thread pitch 908; e.g., axially extending grooves 221 for more direct rotation resistance, etc.). Even further, similar resistance effects as those produced by the radially-outward extending groove 221 appears likely to derive from an "inverted groove", i.e., a radially-inward extending ridge 221 as shown in the embodiment of FIGS. 13A, 13B. We expect this concept to produce varying degrees of improved locknut holding strength whether the groove/ridge feature 221 is a radially outward or inward extending feature—either recess or bump—that abruptly changes the otherwise smooth cavity wall 122, preferably having a sharp edge that is somewhat orthogonal to movement of the crimped ferrule relative to the cavity wall 122 of the nut 220.

FIGS. 15A-15B illustrate how the ferrule locknut 100 installation process produces the locking ridge 210 according to the inventive method of use. The method of use with the modified ferruled locknut set 100' is substantially equivalent to the previously described methods, although the torque magnitude sufficient to crimp the ferrule as intended may be somewhat higher than with an unmodified locknut 120 (no groove or ridge feature 221).

FIG. 15A shows a first cavity nut 120 that has been screwed onto a bolt 910 and tightened against two workpieces 914a, 914b to form a joint that is clamped to a specified torque per usual practice for nuts 20, 120 holding such a joint. The ferrule 110 has been positioned on the bolt's threaded rod 910 with a first end 112a against the first nut (i.e., up against the cavity 122 in the inside face 126 of the first nut 120). Also the second nut, here being a grooved locknut 220, is threaded onto the threaded rod 910 and hand tightened against the ferrule 110 (i.e., the second ferrule end 112b is against the cavity wall 122b of the second nut 220). The ferruled locknut set 100' is designed such that this hand tightening will result in the two nut faces 126a and 126b still being separated (not touching each other).

FIG. 15A also shows that the grooved locknut set 100' is designed to position the groove 221 where the ferrule end 112 will be able to move around behind an edge of the groove/ridge feature 221 when it is crimped. Although the groove 221 will work to some degree no matter where it is positioned on the wall of the cavity 122, the present thinking is that it will work best if located at or close to where the thinnest (or farthest out) portion of the ferrule end 112 becomes pinched between the OD of the threaded rod 910 and the cavity wall 122, as shown in FIG. 15A.

FIG. 15B shows the result of crimping, wherein the second nut (grooved locknut 220) is tightened a specified amount on the ferrule 110, and possibly also against the first nut 120. In an embodiment, for example, the specified amount could be "¼ turn" (one quarter turn, i.e., 90 degrees). In another embodiment, for example, the specified amount could be "until the two nut faces 126 touch", and/or until a specified torque is achieved. As in previous embodiments, the ferrule 110 is swaged in a way that causes it to press tightly against the cavity walls 122a, 122b while also being crimped down into the threads 908 of the rod. The improvement here is that the ferrule material's displacement caused by the swaging effect will also cause it to be squeezed radially outward into the groove 221 to produce the circular ridge 210 around the ferrule 110. The dimensions, shape and/or material of the ferrule 110 used with the grooved locknut 220 can be adjusted to optimize the locknut holding effect.

Prototype ferruled locknut sets 100' with one or two modified cavity locknuts 220 (grooved, ridged) have been tested on an Instron and in a rigorous standard "Junker Fastener Vibration Test." So far, tests of limited sample size have yielded excellent results, possibly even better than the above-described ferruled locknut sets 100.

Suitable ferrule and cavity materials, shapes and relative dimensions are still being developed to optimize the design. For example, a straight (untapered) center length LC (see FIG. 18) of the ferrule body 114 can be varied to vary the amount of material involved and the degree of swaging/crimping that occurs. For example, rather than a conical shape, the tapered profile of the nut cavity 122 can be curved like a wire drawing die (FIG. 3B), or could be shaped like a swaging tool. Another example is illustrated in FIG. 4B, wherein a taper angle A12 of the ferrule end(s) 112 could be different than a taper angle A22 of the nut cavity 122. This may cause a greater amount of ferrule deformation, at least at the thinner outside ends 112, which may be advantageous.

A tapered ferrule end 112 (e.g., tapering to a thin end) has been shown in most of the example embodiments described hereinabove because it was first assumed to be best, often wherein the ferrule end taper angle A12 is close to matching the cavity wall taper angle A22 (e.g., as shown in FIGS. 4B, 6B, and 11). FIGS. 7A, 8, 9 and 17A-B illustrate situations wherein a ferrule end slope A12 is changed to adapt to an object other than a locknut 120 having a tapered cavity 122. The logic behind the ferrule shape designs includes determining where and how much the ferrule will be distorted by crimping, the quantity of ferrule material that will be available for "moving around" in a given part of the tapered cavity 122, and also the magnitude of torque on the locknut 120, 220 that will be required to achieve a "sufficient" amount (and location) of crimping. Given these considerations, the applicant has determined that a significant result of tapering the ferrule end(s) 112 is that the taper selectively "weakens" a portion of the ferrule 110 (the tapered end 112), thereby providing a way to control the crimping results. All of this assumes, of course, that the shape of the cavity 122 in the nut 120 is the primary determinant of the nature of the crimping action. In general, at least a portion of the tapered cavity wall 122 is sloped from a larger diameter to a lesser diameter such that a portion of an axially directed force of the sloped cavity wall 122 against the ferrule end 112 will be redirected by the cavity slope to produce a radially inward directed crimping force on the cylindrical ferrule end 112.

FIG. 16 illustrates a variety of ferrule modifications beyond length and end slope variations. The drawing shows a modified ferrule 110" wherein slots 113 and grooves 115 are used in a variety of embodiments to vary the location and amount of ferrule weakening. (Obviously all of the illustrated weakening features are unlikely to be implemented all together as shown. The drawing is merely a composite used to show the different features.) The two terms are used rather conventionally, i.e., a "slot" 113 is a region of the ferrule 110" where material is removed by cutting radially all the way through the ferrule, thus making the slot 113 "radially open". A "groove" 115 is a region of the ferrule 110" where material is removed by cutting only partially through the radial thickness of the ferrule 110", thereby making the region thinner. In the example of FIG. 16, the ferrule 110" has both axially distal ends 112 tapered. A ferrule length L comprises a straight center portion of length LC, and tapered front and back ends 112 of equal length LN.

A first exemplary slot 113a extends axially from an end 112 (edge) to a slot length LS a with a uniform slot width WS. As illustrated, this first slot 113a is the same length LS as the end length LN, is mirrored on the distal ferrule end 112, and is regularly spaced around the circumference of the ferrule 110". This kind of slot will make the ferrule ends 112 easier to crimp. A second exemplary slot 113b extends the entire end to end length of the ferrule 110", turning it into a "C-shaped" ferrule 110" that will likely be the easiest ferrule to crimp, depending upon the shape of the tapered cavity 122 with which it is mated. Two other examples of slots 113c and 113d, are shown as circumferentially extending slots placed along a tapered end 112 and along a center portion 114, respectively. These will allow some axial collapsing (telescoping) depending upon their length.

The grooves 115 will have similar or not-so-similar effects, depending upon groove depth as well as placement and length. For example, a circumferential groove 115a may collapse on only one side of the ferrule thickness, thereby resulting in a bending moment. A second exemplary groove 115b is cut into the outside surface of the ferrule 110" and extends axially.

By weakening a specific portion of the ferrule, as selected by a designer, the slots 113 and/or grooves 115 generally make the ferrule easier to crimp (less force applied). As discussed, one design objective is to make the ferrule 110" easier to radially crimp (swage) to a reduced diameter and circumference, due to less material and less stiffness. This may enable, for example, the use of harder material in a slotted ferrule 110" versus a comparable un-slotted ferrule 110, 110' (e.g., steel versus brass). Or, for example, this may provide a "light duty" version of the ferruled locknut 100 concept. Alternatively, this may actually improve the holding power of ferruled locknuts by enabling, for example, more material to be compressed (swaged) into the threads of the bolt.

It may be noted that the double prime on the ferrule reference number (i.e., 110") is used to indicate a variation in a feature of the modified ferrule 110", versus the unmodified ferrules 110, 110' previously disclosed, however these ferrule differences are expected to be within the scope of a generalized "ferrule" as used in the ferruled locknut sets 100 according to the invention(s) claimed.

Any or all, if not more advantages than those mentioned herein may accrue from using a slotted/grooved ferrule 110", in a ferruled locknut fastener 100, such benefits being determined by further testing and development of variations of the herein disclosed ferrules 110, 110', 110", all such variations being considered optimization and/or usage adaptations within the scope of what has been disclosed herein.

FIGS. 17A and 17B (an enlarged portion of the FIG. 17A view) show an example implementation for some of the component variations discussed hereinabove. In this example, the threaded rod 910 is a fixed stud extending out of a bulkhead or other kind of massive object 912 which serves as the immobilizing component instead of the bolt head 912 shown elsewhere in the drawings. A single workpiece 914 is clamped by a regular nut 20 which serves as the first nut 20a in this ferruled locknut 100 embodiment. The second nut is a cavity locknut 120b that has a tapered cavity 122 wherein the sloped portion of the cavity wall 122 is only at the deepest part of the cavity and the lead-in to that is substantially straight (i.e., cylindrical). The ferrule 110", best seen in FIG. 17B (where the threaded rod 910 is made invisible for better viewing), is correspondingly straight/cylindrical along most of its length except for a very steep taper angle A12 at the first ferrule end 112a. Positioned immediately behind the tapered end 112a is a circumferential groove 115 that is cut outward through the ferrule bore wall 111 and most of the way through the thickness of the ferrule body 114.

FIG. 17A shows the ferrule 110" positioned between the first and second nuts 20a and 120b, respectively. The first nut's inside face 26 is substantially flat, and the first ferrule end 112a which faces it has the steep taper angle A12 and the groove 115 behind it. The thought behind this design variation is that when the smallest diameter but frontmost edge 112a is forced against the flat nut face 26, it will tend to crimp down into the threads 908 as the groove 115 collapses at the inside diameter but functions more like a hinge at the outside diameter beyond the groove 115. Thus the crimping action of a tapered cavity is achieved against a flat wall. If necessary, the crimping might be helped by adding some axially oriented edge slots like slots 113a in FIG. 16.

FIG. 17B shows the ferrule 110" after the second nut 120b has been advanced so that the cavity wall 122 touches the first ferrule end 112b which is not at all tapered. The straight portion of the wall 122 confines the straight, close-fitting body 114 so that it cannot bulge outward significantly. Because of the significant concentration of ferrule material at the full-thickness first ferrule end 112b, a significant amount of ferrule material will be crimped against and likely deeply embedded in the threads 908 of the rod, thereby establishing intimate contact with a high force level to provide a significant amount of frictional resistance to relative movement in any direction.

FIG. 18 is provided as a summary of the many types of ferrule variations discussed and/or suggested by the teaching of the present disclosure. The illustration is not intended to be complete and should not be considered limiting of scope in the claims.

At the top of FIG. 18's column of side views, an outside view of a ferrule 110 is used to indicate reference numbers and dimensional labels all together (although the taper angle A12 has been omitted due to crowding). All have been discussed previously in the present disclosure. Below the ferrule 110 the FIG. 18 illustrates partial cross-sectional views of four ferrule embodiments that exemplify some of the wide range of ferrule variations that are asserted to be within the scope of the ferrule 110 (also 110', 110" and the like) component of the invention(s) being claimed. Not all reference characters are shown in each of the following illustrations due to crowding, however references to diameters, for instance, should be easily inferred from the drawing at the top of the Figure.

The ferrule example 110a has tapered first and second ends 112a, 112b (112 collectively), but the body 114 in the center is essentially a point (circle around the ferrule circumference) that will have the largest outside diameter D3 of the ferrule 110a.

The ferrule example 110b has un-tapered first and second ends 112, so the body 114 is the same as the ends 112. all of which have the same outside diameter D3 and inside/bore diameter D1.

The ferrule example 110c is about half the length L of the others, and has only the second end 112b tapered, so the body 114 portion that has the largest outside diameter D3 of the ferrule 110a is the same as, and is located at, the first end 112a. Both the first and second ends 112 of this ferrule 110c serve a purpose as suggested by FIG. 7A, so even if loosely termed a "single-ended" ferrule, it should be understood as a ferrule like the other ferrules 110, but having two very different looking ferrule ends 112a and 112b.

The bottom illustration shows a complete cross-sectional side view of an entire half of the ferrule example 110d, so that its unusual profile will not be misinterpreted. The first end 112a is un-tapered and thus the same thickness as the body 114. The second end 112b has a reverse or inverted taper angle such that the entire length L of the ferrule 110d has the same magnitude outside diameter D3 which is also the "maximum diameter" and the "body diameter". However, the body thickness varies as the inside diameter D1 becomes larger until it equals the outside diameter at the outermost edge of the second tapered end 112b. This will produce a crimp that starts with a curled-inward shape when forced into a uniformly tapered cavity 122 as in most of the cavity locknuts 120 illustrated herein. However, if used with a modified cavity locknut 220 (see FIGS. 12A-13B) the thin outside diameter leading edge 112 may yield some very useful results (with either the groove 221a or ridge 221b feature 221 of the cavity wall 122).

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention as claimed are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A fastener kit for fastening a workpiece using a specified threaded rod, the fastener kit comprising:
    a first nut and a second nut, both the first nut and second nut having a tapered cavity extending axially inward to a predetermined depth from a face of the first nut and second nut and tapering from a larger opening down to the diameter of a threaded portion of the first nut and second nut; which threaded portion of the first nut and second nut has threads that mate with threads of the specified threaded rod;
    a ferrule having an inside diameter defined by a lengthwise bore of a predetermined length that permits the ferrule to be positioned on a threaded lengthwise portion of the specified threaded rod, the ferrule being a non-resilient continuous ring having a profile with a middle collar portion and distal first and second tapered ends tapering down from the collar portion to distal thin edges; and
    instructions for use of the fastener kit, the instructions comprising:
    instruction for positioning the first nut on the specified threaded rod;
    instruction for positioning the ferrule on the threaded lengthwise portion of the specified threaded rod such that the tapered cavity of the first nut engages the first tapered end of the ferrule;
    instruction for positioning the second nut on the specified threaded rod such that the tapered cavity of the second nut engages the second tapered end of the ferrule, wherein the predetermined ferrule length and the predetermined tapered cavity depths place the inside face of the first nut at a predetermined distance from the inside face of the second nut; and
    instructions for forcibly torquing the first nut towards the second nut by a specified force that is predetermined to permanently crimp and deform the material of the ferrule into the threads of the specified threaded rod, thereby providing a predetermined locknut holding force for the fastener kit.

2. The fastener kit of claim 1 wherein:
    the larger opening of the tapered cavity of the nut has a diameter that is greater than or equal to a maximum outside diameter of the ferrule.

3. The fastener kit of claim 2 wherein the ferrule has a flange that extends radially outward.

4. The fastener kit of claim 3 wherein the flange has a high friction surface on at least one of an axially front face and an axially back face.

5. The fastener kit of claim 1 wherein the ferrule bore has threads mated to the threads of the rod.

6. The fastener kit of claim 1 further comprising the specified threaded rod.

7. The fastener kit of claim 1 wherein the specified threaded rod is a bolt.

8. The fastener kit of claim 1 wherein, according to design, the amount of force that is sufficient to crimp the ferrule into the threads of the specified threaded rod is an amount that achieves a stated fraction of a turn after the first and second nuts contact the first and second ferrule ends, respectively.

9. The fastener kit of claim 1 wherein a Fastener Standard strength specification for a nut is achieved by the nut with the tapered cavity by having an extended axial thickness sufficient to maintain a threaded portion of the nut that is in accord with requirements of the Fastener Standard strength specification.

10. The fastener kit of claim 1 wherein the nut has a tapered cavity on both axial faces of the nut.

11. The fastener kit of claim 1 wherein the ferrule has a lesser outside diameter at either or both of the ends than it does between the ends.

12. The fastener kit of claim 1 wherein the ferrule has one or more weakened portions for reducing the amount of force that is sufficient to crimp the ferrule against the threads of the specified threaded rod.

13. The fastener kit of claim 12 wherein the ferrule is weakened by one or more radially open slots.

14. The fastener kit of claim 12 wherein a portion of the ferrule is weakened by reduced thickness.

15. The fastener kit of claim 1 wherein a wall of the cavity in the nut has a radially extending groove or ridge feature.

16. The fastener kit of claim 1 wherein the nut face with the tapered cavity has a high friction surface feature.

17. The fastener kit of claim 16 wherein the high friction surface feature comprises radial serrations.

18. The fastener kit of claim 17 wherein the radial serrations have a ramped sawtooth shape for interlocking with complementary mating ramps on an adjacent surface.

* * * * *